US012793267B1

(12) United States Patent
Novey

(10) Patent No.: US 12,793,267 B1
(45) Date of Patent: Nov. 10, 2026

(54) SMARTPHONE-BASED SEXTANT ENHANCED BY AN AUTOMATIC CAMERA CALIBRATION FOR ATTAINING ACCURACIES COMMENSURATE WITH MARINE NAVIGATION

(71) Applicant: Michael Peter Novey, Ellicott City, MD (US)

(72) Inventor: Michael Peter Novey, Ellicott City, MD (US)

(*) Notice: Subject to any disclaimer, the term of this patent is extended or adjusted under 35 U.S.C. 154(b) by 0 days.

(21) Appl. No.: 19/314,017

(22) Filed: Aug. 29, 2025

(51) Int. Cl.

| | |
|---|---|
| ***G06T 7/80*** | (2017.01) |
| ***G01S 19/25*** | (2010.01) |
| ***G06T 7/73*** | (2017.01) |
| ***H04N 17/00*** | (2006.01) |
| ***H04N 23/60*** | (2023.01) |
| ***H04N 23/63*** | (2023.01) |
| ***H04N 23/67*** | (2023.01) |
| ***H04N 23/73*** | (2023.01) |

(52) U.S. Cl.
CPC .............. *G06T 7/80* (2017.01); *G01S 19/258* (2013.01); *G06T 7/73* (2017.01); *H04N 17/002* (2013.01); *H04N 23/63* (2023.01); *H04N 23/64* (2023.01); *H04N 23/67* (2023.01); *H04N 23/73* (2023.01); *G06T 2200/24* (2013.01)

(58) Field of Classification Search
None
See application file for complete search history.

(56) References Cited

U.S. PATENT DOCUMENTS

2012/0021385 A1* 1/2012 Belenkii ................ G09B 27/00 434/19
2019/0043211 A1* 2/2019 Bertrand .................. G01C 1/08

FOREIGN PATENT DOCUMENTS

WO WO-2018055619 A1 * 3/2018 ............... G06T 7/33
WO WO-2025114930 A1 * 6/2025 ............. G03B 37/04

* cited by examiner

*Primary Examiner* — Tyler W. Sullivan
(74) *Attorney, Agent, or Firm* — Rosenberg, Klein & Lee

(57) ABSTRACT

A smartphone-based Sextant achieves accuracies commensurate with marine navigation by using an automated calibration scheme configured to control the smartphone camera and to implement a model that uniquely describes the camera when taking altitude measurements. No extensive navigation experience is needed as the calibration process is completely automated. A calibration factor K(s, r) is computed to mitigate errors associated with parameters s and r of the camera, by compensating errors associated with the parameter s for scaling, image sensor size, and focal length, and by compensating errors associated with the parameter r for lens radial distortion. The system was tested on LG and CUBOT phones during sea trials. With 10 images used for calibration, average accuracies of 5.34 nm were realized on the LG and 4.3 nm on the CUBOT.

20 Claims, 16 Drawing Sheets

Table 1. Table of cameras data used in data collection and accuracies

| Smartphone | FOV deg | Nautical miles per pixel | Number of sightings | Mean abs. error nm | Mean error nm | Collected |
|---|---|---|---|---|---|---|
| LG G8 | 94 | 1.7 | 50 | 4.36 | 0.01 | At sea |
| CUBOT x30 | 80 | 1.875 | 25 | 4.26 | 0.11 | At sea |
| Samsung Galaxy | 65 | 1.9 | 15 | 4.3 | -0.47 | On beach |

*FIG. 9*

Table 2. Example calibration table with five sightings

| x1 | y1 | x2 | y2 | True angle |
|---|---|---|---|---|
| -121 | 643 | -150 | -325 | 34.0682 |
| -134 | 434 | -133 | 2.0 | 15.6123 |
| -25 | 1273 | -30 | -834 | 67.6902 |
| -3 | -33 | 10 | -759 | 24.7045 |
| -115 | 894 | -77 | -369 | 43.0533 |

*FIG. 12*

SMARTPHONE-BASED SEXTANT ENHANCED BY AN AUTOMATIC CAMERA CALIBRATION FOR ATTAINING ACCURACIES COMMENSURATE WITH MARINE NAVIGATION

FIELD OF THE INVENTION

The present invention relates to the field of celestial navigation, and specifically, to utilization of a smartphone camera to produce celestial sightings with accuracies consistent with a marine sextant.

The present invention also addresses utilization of a smartphone camera for the added functionality of a sextant for highly accurate celestial navigation.

More in particular, the present invention relates to a smartphone with an embedded camera calibration scheme to attain accuracy commensurate with marine navigation.

In addition, the present invention is related to a highly accurate sextant for celestial navigation based on the smartphone which uses the scheme for automated calibrating the smartphone camera.

BACKGROUND OF THE INVENTION

A sextant is a device for measuring the altitude, or angle, of a celestial object and the horizon. Many celestial bodies, such as the Sun, moon, and other planets and stars, can be used for navigation. As an example, for present description, the Sun will be used as the celestial body. Given a current time, there is a known place on the Earth, where the Sun is positioned directly overhead. This location is called the Global Position (GP), as shown in FIG. 1A. At the GP, the Sun's altitude, or the angle from the horizon, is 90°. Assuming that a navigator located at a point P1 uses a sextant to measure the angle to the Sun and measures the angle from the horizon of 89°. Knowing that one minute of arc (1°/60) is one nm on the Earth, then one degree is 60 nm. Therefore, the navigator is located somewhere on a circle 60 nm from the GP.

Knowing the location at somewhere on this circle is not very useful for navigation, since this information would be difficult to plot on a chart. Celestial navigation uses this information in a practical way by interpreting this circle on a chart as the Line of Position (LOP) shown in FIG. 1B.

The starting point in celestial navigation is an estimate of the navigator's position. This position is called a dead reckoning (DR) point. The DR is calculated periodically during the sail by using a compass heading and speed.

In marine applications, a navigator must often make sightings on a rocking boat, which greatly reduces the accuracy of the measurements. Along with altitude measurements, the navigator also has the estimated position, i.e., the Dead Reckoning (DR), the date and time of the sighting, and the height of the sextant above the water level.

Given the time, it is possible for an ephemeris to provide a true altitude to the Sun, assuming the position of the navigator at the DR, and the heading, or direction, to the Sun. However, since the DR is an estimated position, where the estimation is based on the boat heading and speed, wind and current usually cause the discrepancy between the position of the navigator and the DR. Therefore, the navigator measures a different altitude than the ephemeris value. This difference in altitude is used to determine how far the navigator is from the DR.

Since the degree is 60 nm, the difference in angle can be converted to a range in nm. The range and heading to the Sun are used to plot a line of position (or LOP), as shown in FIG. 2. In this example, at DR1, the altitude measured is 0.1 degree less than the ephemeris value, meaning that the navigator is farther from the Sun's position by 6 nm (60 nm/DEG×0.10). The ephemeris also provides a heading to the Sun approximately 100° to the East in the example shown in FIG. 2. With these two pieces of information, the LOP is plotted, as shown, and the best estimate of the navigator's position with one sighting is somewhere on the LOP (1).

At some time later, the navigator estimates a new position DR2, and makes a second sighting resulting in the LOP (2). The LOPs are combined by extrapolating LOP (1) into the current time, or DR2. The best estimate for the navigator's position called a Running Fix (RF) lays at the intersection of the lines, as seen in FIG. 3. This process continues as more sightings are made by the navigator.

Several corrections however are needed to convert the sextant altitude to the true altitude, namely, the tilt (calculated from the height above the water), parallax, and refraction.

In the real world, celestial navigation accuracy is contingent on the accuracy and quality of the sextant, the skill of the mariner (navigator), and the sea conditions. Noting that professional grade sextants usually cost at least $1,000.00 (and most usually $2,000.00), it is very questionable that incorporation of such a costly and highly precision sextant camera in a smartphone with a plastic lens system the size of a quarter of a pencil eraser, would be viable for the achievement of the precision needed for marine navigation.

Different errors occur, such as reading the almanac, rounding of values, transcribing the numbers, and plotting. Seasoned ocean navigators, measuring from a moving platform under fair conditions, can achieve a practical accuracy of approximately 1.5 nm. Whereas, the Admiralty Menu of Navigation, 2008, Vol. 9, describes the accuracy of astronavigation as 2 nm (Ministry of Defense, Royal Navy, 2008, Admiralty Menu of Navigation, Vol. 9).

However, quartermasters during a US Navy training class achieved an accuracy of about 10 nm, which is expected from a beginner, as described in J. Escobar, Bring Celestial Navigation into the 21$^{st}$ Century, Proceedings U.S. Naval Institute, Vol. 147, December 2021.

Currently, smartphones rely on the smartphone's internal gyroscope (gyro) to measure the angles to the sun and horizon. Testing of 56 smartphone internal gyros resulted in the gyro accuracies of 0.5°-3.0°, or 30-180 nautical miles, as outlined in C. Kuhlmann, et al., "Smartphone Sensors Accuracy Values from Device to Device in Mobile Research: the Case of Spatial Orientation", Behav Res 53, pp. 22-33, 2021. It is clear that Sextant Apps using the smartphone's gyro will not have the required accuracy for celestial navigation.

Using the smartphone camera is a viable option to measure the three-dimensional (3D) angle between objects using a two-dimensional (2D) image, as depicted in FIGS. 4A-4B. For example, the LM-G8 camera has 0.028°/pixel, or 1.7 nm per pixel. If the center of the Sun and the horizon can be found, then the camera has the required resolution for accurate sightings. However, this mapping from the 2D image to the 3D world require knowledge of the intrinsic camera parameters, such as the focal length and the sensor size.

However, the smartphone camera can change the focus, zoom, and move freely, resulting in the need to estimate the intrinsic parameters, as outlined in P. Saponaro, et al., "Towards Auto-Calibration of Smartphones Using Orientation Sensors", 2013, IEEE Conference on Computer Vision and Pattern Recognition Workshops, Portland, OR, USA, 2013, pp. 20-26. For example, the LM-68 published camera focal lens has a 1.3% error. Another limiting factor in accuracy is the radial distortion common to wide-angle lenses.

Since using the smartphone camera for navigation has been entertained by various smartphone producers, it is not surprising that those are found in numerous publications including Cam Sextant by Omar Reis, found on Google Play with the earliest review 2020 Apr. 19. This App is directed to a system for measuring celestial object altitude by using a cellphone in a manner similar to marine sextant. The App uses phone sensors, a camera and, optionally, the GPS. It is described as being capable of pointing the phone at the celestial object to capture the name, altitude, and time for celestial navigation calculations.

Another smartphone-based sextant is Spyglass by HappyMagenta UAB, found on Google Play (earliest review 2019 Apr. 16). This is a system for outdoors and off-road navigation without requiring GPS. The tools provided with this App include the Sun, Moon, and Polaris star finder, and a sextant.

Another Sextant App, available on Google Play, Apple Store, and Amazon (since 2015) is provided on a cell phone or a tablet and uses the device's camera to image celestial objects to estimate longitude and latitude.

A cellphone camera functioning as a sextant is available on NavList-fer3.com (2015 Mar. 27) uses an App called "AR Bearing+Baseplate Compass" by AppyHand. This system is based on taking two good images and plotting the data to find an intercept with the distance. One of the images gives directly the bearing/azimuth angle and the altitude angle.

As published in IEEE, another sextant system, i.e., the "Sextant Towards Ubiquitous Indoor Localization Service by Photo-Taking of the Environment", uses a cellphone to image fixed objects located at an internal space (as opposed to celestial objects), photographs the object and stores the photo and gyroscope data associated with the imaging of the object. The user might not know the reference object to image and thus uses image matching, which appears to essentially establish the reference object on the fly.

U.S. Patent Application Publication No. 2019/0104492 is directed to the cellphone-based land navigation. This system uses a smartphone's sensors, i.e., cameras, compasses, and inertial measurement units. The data taken by the sensors are processed to determine the accurate and timely geo-locations to enable land navigation in GPS-denied environments. Celestial, terrestrial, and inertial land navigation modes are described in terms of how smartphone sensors are exploited and how data from the sensors is processed to achieve accurate and timely geo-position and navigation capabilities in GPS-denied environments.

The celestial navigation method using smartphone sensor system of the '492 Publication comprises the following steps to improve the accuracy and timeliness of the geo-location and navigation results:

1. Remove or correct geometric distortion of the smartphone camera lens;
2. Perform a centroid estimation to find the center of the celestial object of the Sun image;
3. Use of a camera application with exposure compensation that is preferably greater than −3 EV in order to render the Sun image as a disk instead of a circular image flare;
4. Use of a panoramic algorithm, with large −EV compensation, that uses the smartphone IMU angle for stitching information instead of image content;
5. Provide an accurate photo timestamp with the actual time preferably using the smartphone real-time clock;
6. Perform geo-location computations using nautical almanac reduction tables, i.e., the location of the celestial objects' Greenwich hour, angle and declination;
7. Perform automatic computations of the centroid of celestial object-to-horizon calculation based on the number of pixels in the field of view of the smartphone image;
8. Input the calculated angle and time from the smartphone sensor system real-time clock into the sight reduction tables; and
9. Return of the calculated position of the user.

The most accurate sensors in a smartphone are generally the camera (with an angular resolution of approximately 1.2 arc minutes) and the real-time clock (with drift typically of less than 10 seconds/day without GPS update). These sensors are used as the primary sensors in the system described in the '492 Publication. Lower accuracy sensors in a smartphone include the inertial measurement unit and the compass. The smartphone camera is used to accurately compute angles for geo-location. In this manner, the smartphone is configured to be used as a sextant without the requirement for the sextant operation skills or for a visible local horizon. The system can also be used to provide landmark triangulation navigation by accurately computing angles from an observing site or position.

An Iphone Sextant Project by the Autodesk Instructables is disclosed in U.S. Pat. No. 10,323,939. In order to improve accuracy, the system uses a telescope viewfinder instead of the camera, but uses the phone's gyroscope to determine the altitude and navigation App on the phone.

Yet another DIY Sextant, i.e., the CamSextant found in the Navigator, describes an improvement of the Iphone Sextant presented in '939 Patent. A telescope viewfinder is added to the Iphone to improve imaging. It is of particular interest that the reference states that the Iphone can be used without the telescope adaptation, using the cellphone's camera for imaging. Calibrating the camera by imagining the horizon is used to set the zero altitude of the device.

U.S. Patent Application Publication No. 2016/0012290 is directed to a photo-optic comparative geo-location system which has a digital sextant. The digital sextant includes an internal compass and an internal gyroscope for stabilization. The internal gyroscope may be in the form of a laser or fiber-optic gyroscope, or it may be a conventional mechanical gyroscope. Additionally, the digital sextant may include a camera to assist with recognition of celestial objects. A sextant storage database provides the ability for the digital sextant to maintain star maps, or other types of sky maps, or images, as viewed from varying locations around the Earth. A picture processor provides the digital sextant with the internal capability to compile data from each of the foregoing internal components and provide resulting location data.

It is not believed that any of the above-presented systems can achieve an accurate positioning commensurate with the demands of celestial navigation. For example, the publication on the CamSextant" explicitly states that, while the gyro is a nice piece of equipment, it is not nearly as precise as a marine sextant, and that in a rocking boat the gyro response is worse.

The system described in U.S. Patent Application Publication #2019/0104492 uses the published lens focal lengths to calculate the IFOV to measure the angle between two objects in an image, i.e., the degrees per pixel value, as stated in Paragraph [0021] of the Publication. Using this method probably will result in errors in excess of 1°, or 60 nautical miles (nm). The system is neither capable of correct measurements of the angle between objects in an image and nor will probably work. The more accurate and standard way would be to measure the angle between two vectors starting at the focal point and extending to the pixel as in a ray trace.

Another problem associated with the device described in the '492 reference is using the published values of the focal lengths, which are highly inaccurate. The most accurate camera, such as the camera found is an LG, has a 1.4% error in the focal length. This error results in the 0.6° (or 36 nm) position error. An even worse error of 10% is found with the lower-priced CUBOT phone. The error in the published values is not correctable by some hand waving to "remove or correct geometric distortion", as stated in Paragraph [0041] of the reference.

Another problem associated with the system described in '492 reference, is the measurement of the reflection of an object in the water (as presented in Paragraph [0015] of the reference). This task would be impossible out in the ocean. Also not mentioned is that centroiding the sun results in an error due to the projection of a sphere onto a flat image plane. This error is small, about 1.5 nm at 70° elevation, but can be compensated for. Since it is not believed that the system described in '492 reference actually has been implemented, it is not possible to prove the workability of this approach.

None of the devices presented in the previous paragraphs, or other smartphone sextants available on the market, are believed to be able to achieve the accuracies commensurate with the sextant navigation. It is therefore a pressing need to provide a smartphone camera capable of making celestial sightings with accuracies consistent with the marine navigation for supporting the operation of a highly precise smartphone-based sextant.

SUMMARY OF THE INVENTION

It is therefore the objective of the present invention to provide a smartphone-based sextant system and a method to realize accuracies commensurate with marine navigation, through utilization of the smartphone camera automated calibration scheme embedded in the smartphone in question.

It is another objective of the present invention to provide the sextant application (App) for the smartphone capable of celestial sighting accuracies of as high as 4 nm which was tested on numerous phone cameras in real sea conditions.

It is a further objective of the present invention to provide a highly precise smartphone-based sextant system which does not require celestial navigation skills and where the highly precise celestial navigation is achievable by unique calibration scheme implemented in the smartphone.

It is an additional objective of the present invention to provide a smartphone-based sextant system which requires to calibrate the smartphone camera based on 5-10 images taken with an accurate timestamp, latitude, and longitude, and processed with a unique calibration scheme embedded in the smartphone.

It is still an objective of the present invention to provide a smartphone-based sextant as an all-in-one tool to perform accurate celestial navigation, where the main components of the smartphone-based sextant include (a) an ephemeris for the Sun, Moon, Venus or Mars with accuracy up to 1/3600$^{th}$ degree, (b) a camera for the controlled setting of the exposure and focus, (c) the Sun and horizontal pixel finding algorithms, (d) plotting tools that display sighting results (LOPs, RF, etc.), and (e) a unique calibration scheme embedded in the smartphone sextant Application.

Viewing in one aspect, the present invention constitutes a smartphone-based sextant system for celestial navigation, which comprises:

a camera with a field-of-view (FOV) of approximately 90° installed in a smartphone and adapted for taking a predetermined number of images having a celestial object and a horizon line. Each image is tagged with a timestamp, a latitude, and longitude provided by a GPS sub-system either internal or more precise external to the smartphone.

A Calibration Processor Unit is embedded in the smartphone in operative coupling to the camera and the GPS sub-system. The Calibration Processor Unit is configured with:

a Camera Control Processor Unit operatively coupled to the camera to ensure accuracy of each image, a Graphical User Interface Processor Unit operatively coupled to the camera and Camera Control Processor Unit, where the Graphical User Interface Processor Unit is configured for receiving from the camera and displaying thereon each image tagged with the timestamp, latitude and longitude, a Navigation Calculations Processor Unit operatively coupled to the camera, Camera Control Processor Unit, and said Graphical User Interface Processor Unit, where the Navigation Calculations Processor Unit is configured to process a celestial object and horizon designated through the Graphical Unit Interface Processor Unit and to calculate center pixel values (x1, y1) and (x2,y2) of positions of the celestial object and horizon, respectively, a User Interface sub-system operatively coupled to the Navigation Calculations Processor Unit and Graphical User Interface Processor Unit and actuatable once an image is chosen to be used as a calibration image for calibration processing, an Ephemeris/Almanac Processor Unit operatively coupled to the Navigation Calculations Processor Unit and Graphical User Interface Processor Unit and configured to compute a true altitude control heading of the celestial object based on the timestamp, latitude and longitude of the calibration image received from the Navigation Calculations Processor Unit and Graphical User Interface Processor Unit, a Calibration Table Processor Unit operatively coupled to the Ephemeris/Almanac Processor Unit, Navigation Calculations Processor Unit, and Graphical User Interface Processor Unit and configured to store the center pixel values (x1, y1) of the celestial object and center pixel values (x2, y2) of the horizon along with the true altitude and the measured altitude of the celestial object on each image for the predetermined number of images, a Calibration Factor Calculation Processor Unit operatively coupled to the Calibration Table Processor Unit, Navigation Calculations Processor Unit, and Graphical User Interface Processor Unit, and configured to compute a calibration factor K(s, r) to be transmitted to the Navigation Calculations Processor Unit to mitigate errors associated with parameters s and r of the camera, by compensating the errors associated with the parameter s for scaling, image sensor size, and focal length errors, and by compensating the errors associated with the parameter r for lens radial distortion.

The Camera Control Processor Unit is configured to receive each image, processing each image, and to generate a camera control signal to the camera, so that the camera control signal provides a coded request to set the auto exposure of the camera to darken said each image to prevent blooming of the celestial object, to turn off the auto focus regime of the camera, to set off a stabilization regime of the camera, and to set the focus distance of the camera to infinity.

The Calibration Calculations Processor Unit is further configured to compensate for the scaling errors by multiplying the focal length by the parameter s; and to compensate the lens radial distortion by multiplying the pixel value y2 by the parameter r. The Camera Control Processor Unit is further configured to compute the focal length of the camera in pixels based on a focal length and an image sensor size of the camera.

The Calibration Calculations Processor Unit is configured to estimate the parameters r and s based on the values stored in the Calibration Table Processor Unit by applying Newton-Raphson non-linear optimization.

The number of images processed for the camera calibration ranges from 5 to 10.

In another aspect, the present invention constitutes a method for calibrating a camera in a smartphone-based sextant for celestial navigation, which comprises the following steps:

- adapting camera installed in a smartphone for taking 5-10 images, each having a celestial object and a horizon line,
- tagging each image with a timestamp, a latitude, and longitude provided by a GPS sub-system (either internal to the smartphone or more precise external to the smartphone),
- embedding a Calibration Processor Unit in the smartphone in operative coupling to the camera and GPS sub-system,
- operatively coupling a Camera Control Processor Unit to the camera to ensure accuracy of each image,
- operatively coupling a Graphical User Interface Processor Unit to the camera and Camera Control Processor Unit, and configuring the Graphical User Interface Processor Unit for receiving from the camera and displaying thereon each image tagged with the timestamp, latitude and longitude,
- operatively coupling a Navigation Calculations Processor Unit to the camera, Camera Control Processor Unit, and the Graphical User Interface Processor Unit, and configuring the Navigation Calculations Processor Unit to process a celestial object and horizon designated through the Graphical Unit Interface Processor Unit and to calculate center pixel values (x1, y1) and (x2, y2) of positions of the celestial object and horizon, respectively,
- operatively coupling a User Interface sub-system to the Navigation Calculations Processor Unit and Graphical User Interface Processor Unit, and actuating the User Interface sub-system once the image is chosen to be used as a calibration image for calibration processing,
- operatively coupling an Ephemeris/Almanac Processor Unit to the Navigation Calculations Processor Unit and Graphical User Interface Processor Unit, and configuring the Ephemeris/Almanac Processor Unit to compute a true altitude control heading of the celestial object based on the timestamp, latitude and longitude of the calibration image received from the Navigation Calculations Processor Unit and Graphical User Interface Processor Unit,
- operatively coupling a Calibration Table Processor Unit to the Ephemeris/Almanac Processor Unit, Navigation Calculations Processor Unit, and Graphical User Interface Processor Unit, and configuring the Calibration Table Processor Unit to store the center pixel values (x1, y1) of the celestial object and pixel values (x2, y2) of the horizon along with the true altitude and the measured altitude of the celestial object on each image, and
- operatively coupling a Calibration Factor Calculation Processor Unit to the Calibration Table Processor Unit, Navigation Calculations Processor Unit, and Graphical User Interface Processor Unit, and configuring the Calibration Factor Calculation Processor Unit to compute a calibration factor K(s, r) for transmission to the Navigation Calculations Processor Unit to mitigate errors associated with parameters s and r of the camera, by compensating the errors associated with the parameter s for scaling, image sensor size, and focal length errors, and by compensating the errors associated with the parameter r for lens radial distortion.

The subject method for calibrating a camera in a smartphone-based sextant for celestial navigation further comprises the steps of setting the auto exposure of the camera to darken said each image to prevent blooming of the celestial object, turning off the auto focus regime of the camera, setting off a stabilization regime of the camera, and setting the focus distance of the camera to infinity.

The present method further comprises the step of compensating, by the Calibration Calculations Processor Unit, the scaling errors of the camera by multiplying the focal length by the parameter s, and the lens radial distortion by multiplying the pixel value y2 by the parameter r.

Preferably, the step of estimating the parameters "r" and "s", is performed by the Calibration Calculations Processor Unit, by processing the values stored in the Calibration Table Processor Unit by applying Newton-Raphson non-linear optimization.

These and other objectives and advantages of the present invention will be more apparent when supported by the detailed description of the present system and method taken in conjunction with the accompanying Patent Drawings.

BRIEF DESCRIPTION OF THE DRAWINGS

FIG. 9 is a table of parameters and accuracy results of smartphone cameras that were calibrated and tested;

FIG. 12 depicts a calibration table created from five sightings;

DETAILED DESCRIPTION OF THE PREFERRED EMBODIMENT(S)

Figure 5:
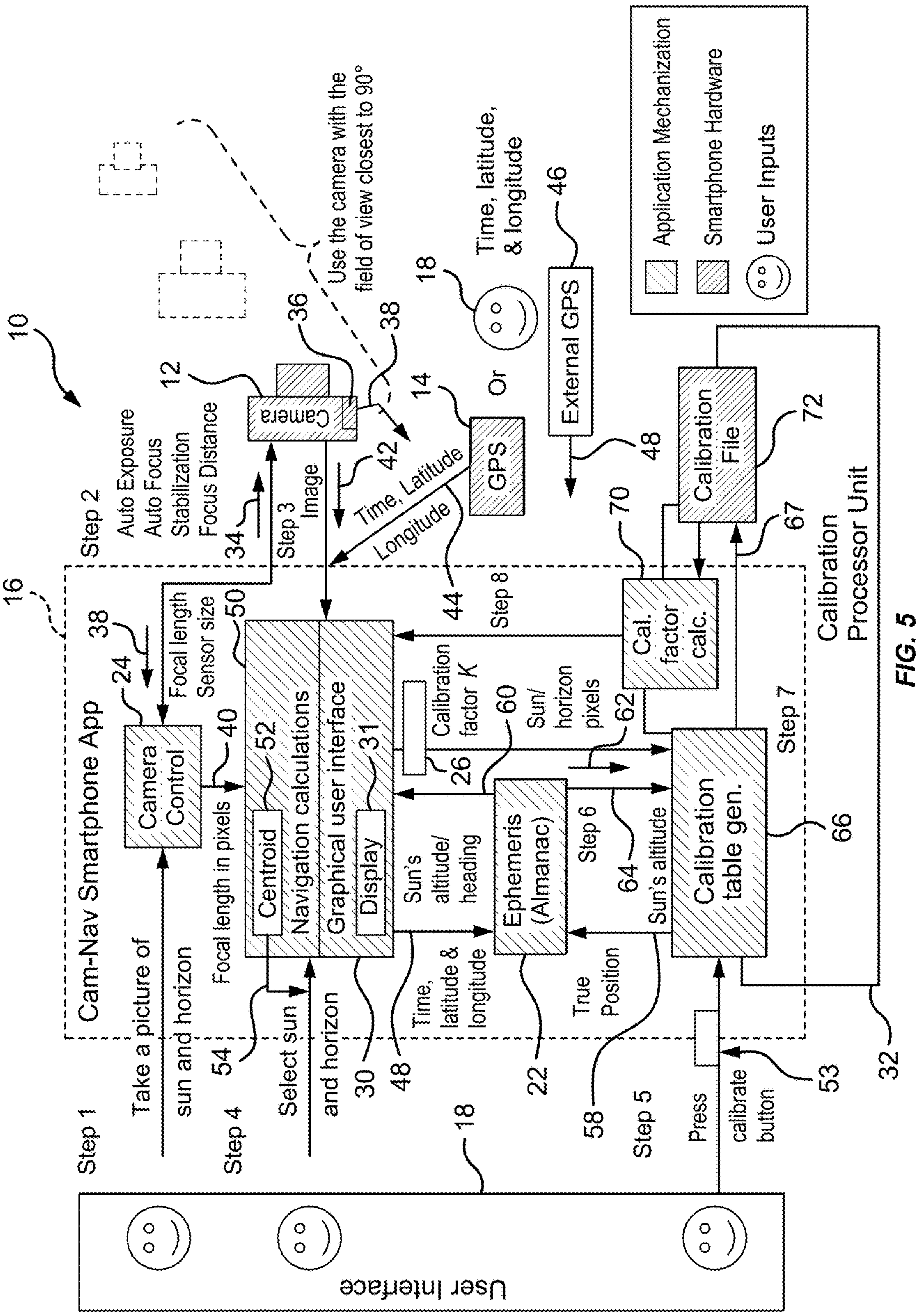
FIG. 5 is a functional diagram of the subject smartphone-based sextant with the Calibration Processor Unit embedded in the smartphone.
Figure 6:
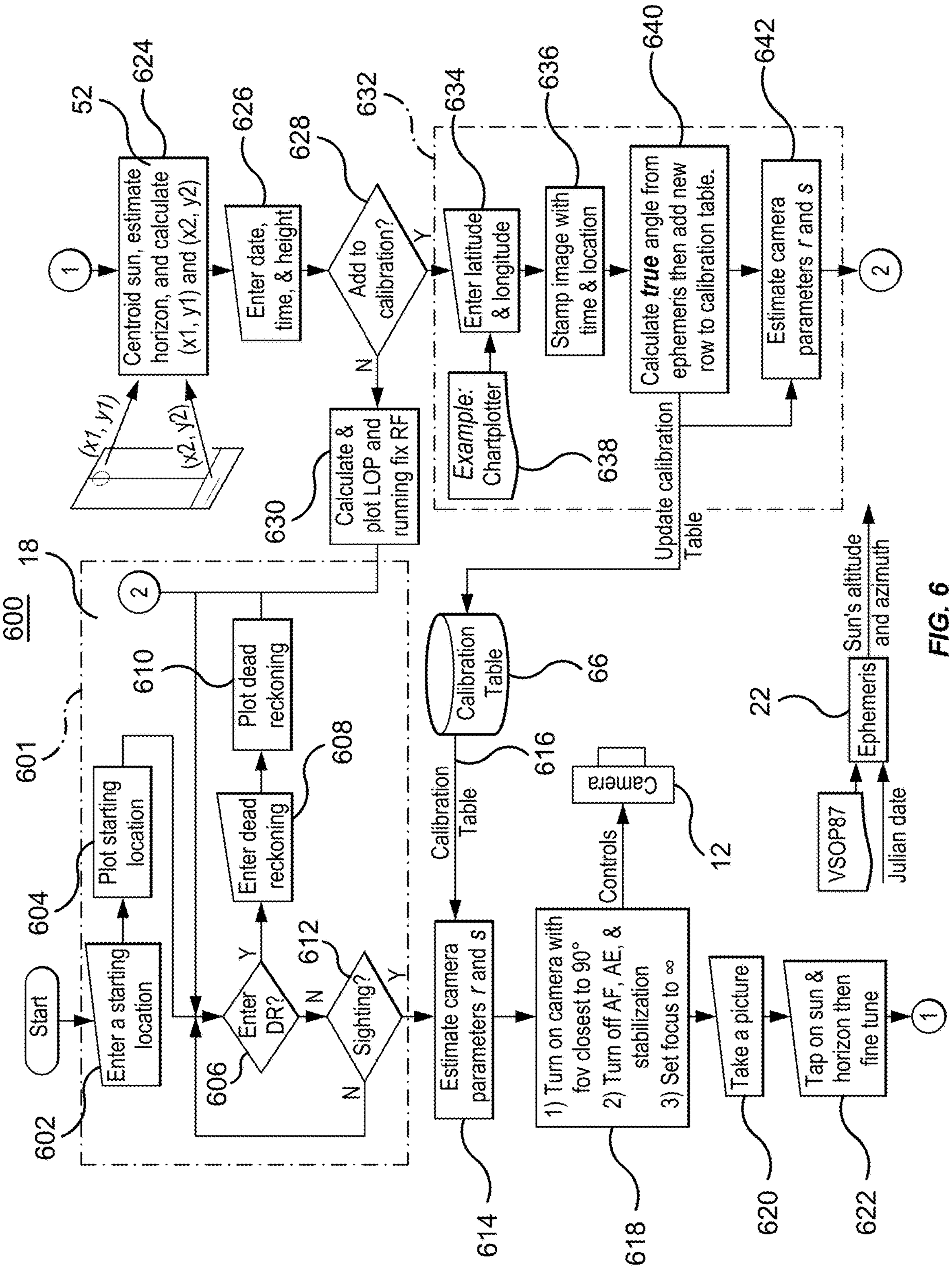
FIG. 6 is a flowchart diagram representative of the operational steps supported by the subject smartphone-based sextant system.
Figure 7:
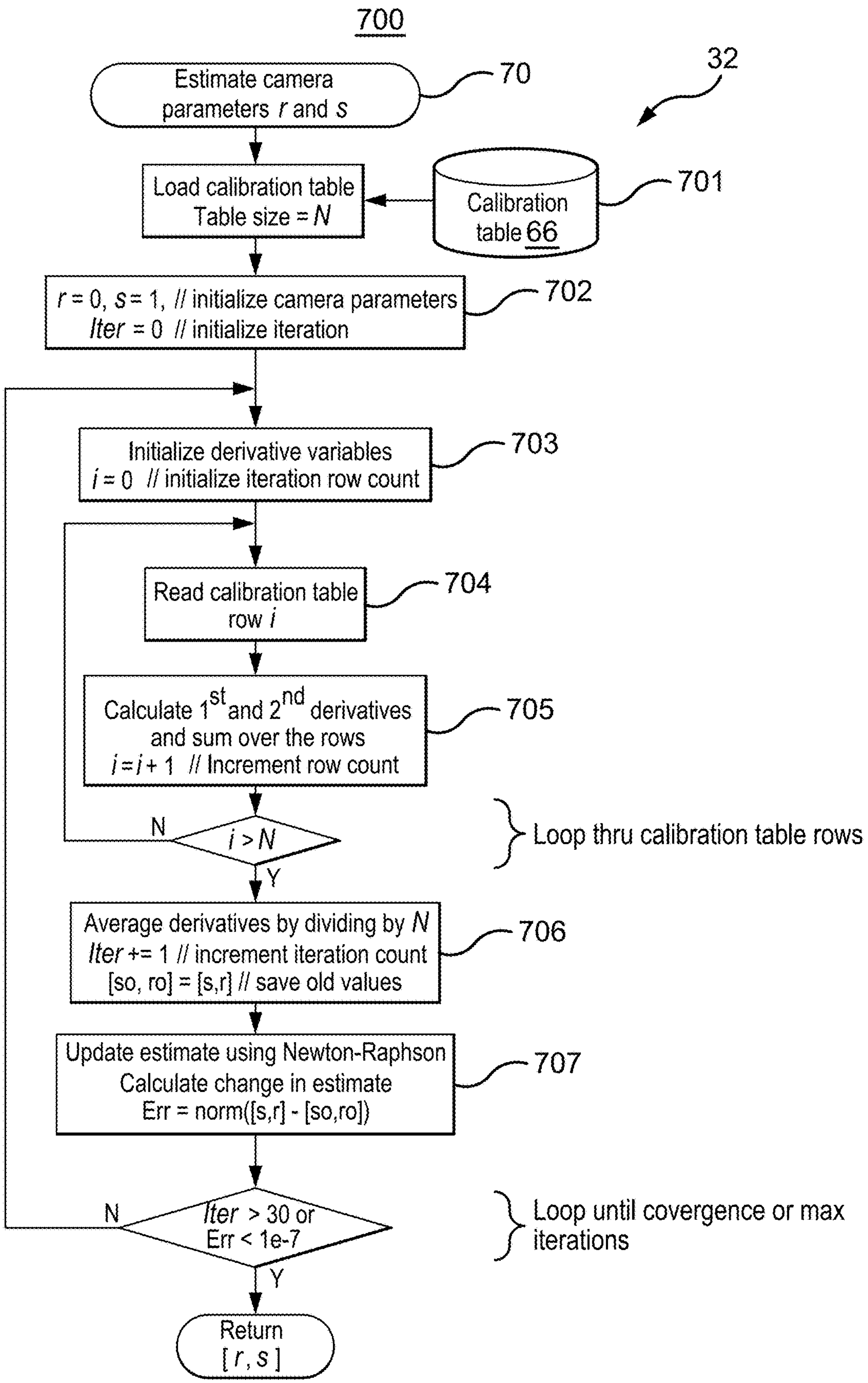
FIG. 7 is a flowchart diagram representative of the subject calibration routine.

Referring to FIGS. 5-7, the subject smartphone 10 includes a camera 12, a GPS sub-system 14, a smartphone sextant sub-system (also referred to herein as a sextant sub-system, or a sextant App) 16, a user interface 18 operatively coupled to the sextant sub-system 16, a Calibration sub-system (also referred to herein as a Calibration Processor Unit) 32 operatively coupled to the Sextant sub-system 16.

The Sextant sub-system 16 is an all-in-one tool to perform accurate celestial navigation. The sextant sub-system 16 is embedded in the smartphone 10 and includes the following main components:

a. Ephemeris sub-system 22 (also referred to herein as Ephemeris/Almanac Processor Unit) for the Sun, Moon, Venus, Mars, and other planets and stars accurate input to $1/3600^{th}$ of a degree;

b. Camera Control sub-system (also referred to herein as a Camera Control Processor Unit) 24 configured for setting the exposure and focus for the camera 12;

c. Sun and horizon pixel finding sub-system (also referred to herein as Sun and Horizon Finding Processor Unit) 26;

d. Plotting tools that display images, and sighting results (LOPs, RF, etc.), also referred to herein as Graphical User Interface Processor Unit 30;

e. Calibration sub-system (also referred to herein as a Calibration Processor Unit) 32; and f. Navigation Calculations Processor Unit 50.

The subject smartphone-based sextant sub-system 16 provides precise celestial sighting accuracy of as high as 4 nm tested on sea cameras in the real sea conditions. In order to provide accurate celestial navigation, no celestial navigation skills are necessary with the present system, since the Calibration sub-system 32 is completely automated and mechanized. To achieve such a high accuracy, the new calibration method is implemented which runs on the sextant sub-system 16 installed in the smartphone 10. All that is required to calibrate the camera 12 is to obtain 5-10 images, each with an accurate timestamp, latitude and longitude.

Figure 8A:
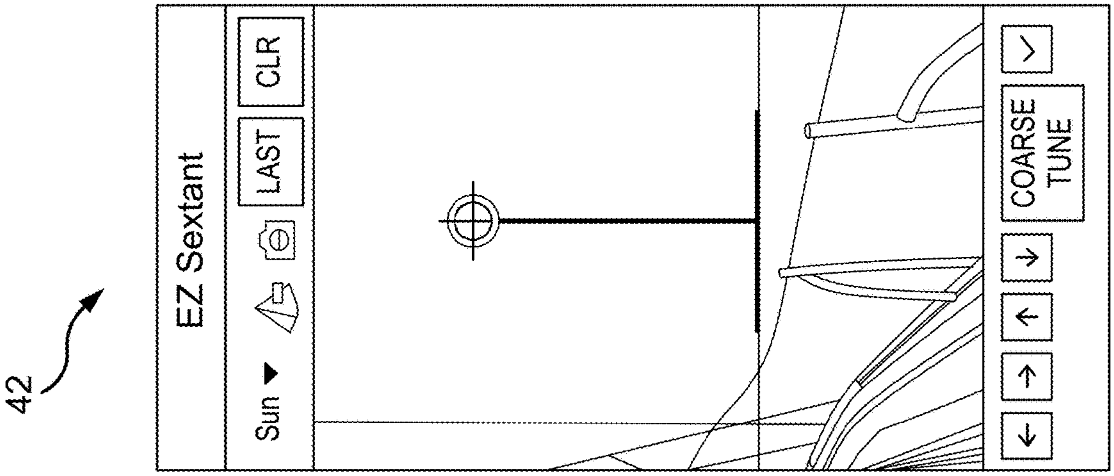
FIG. 8A depicts the subject sextant Application's display and sighting.
Figure 8B:
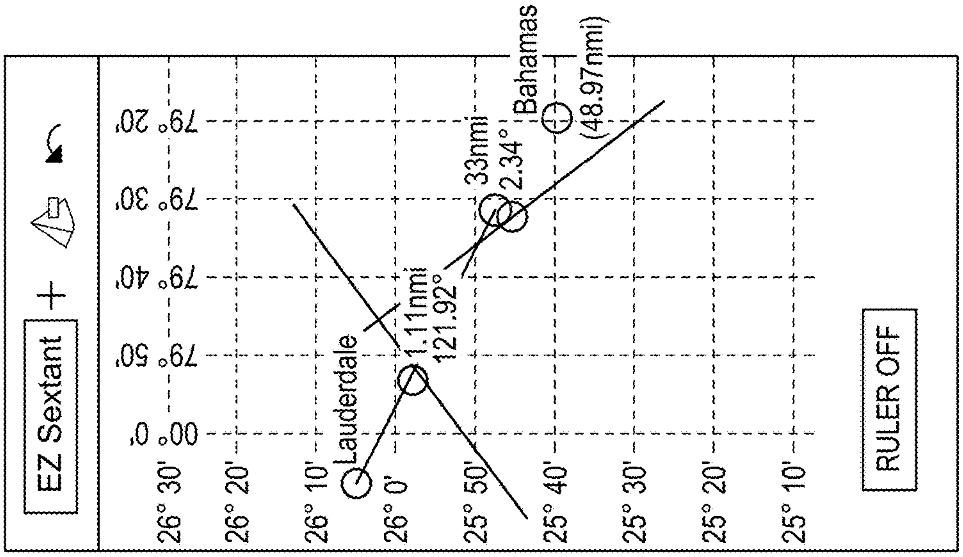
FIG. 8B is a diagram representative of the sighting results plotted as lines of positions (LOPs)
Figure 8C:
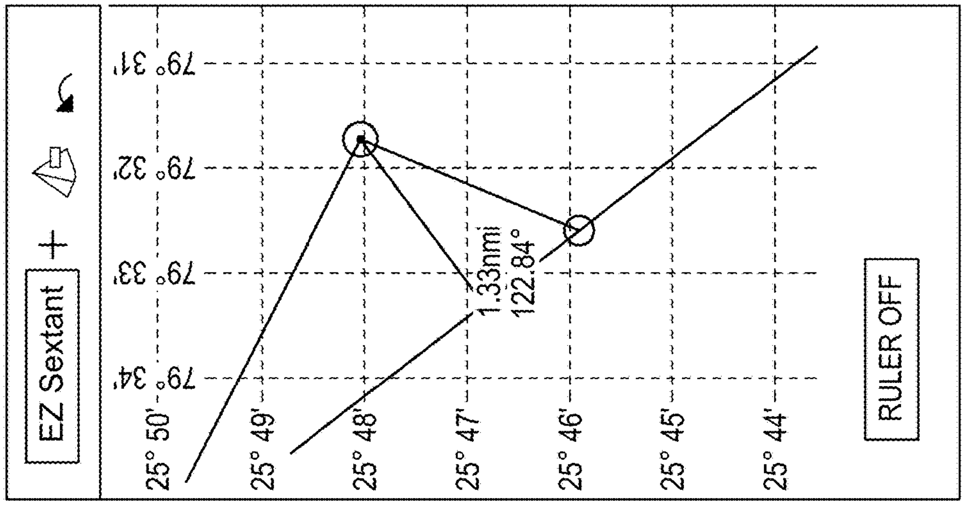
FIG. 8C is a diagram representative of the subject smartphone's sextant Application's display with associated Running Fixes (RFs)

FIGS. 8A-8C highlight some of the sextant smartphone sub-system 16's display, such as a sighting in FIG. 8A, and associated LOPs and RFs in FIGS. 8B and 8C, respectively. Specifically, the smartphone sextant sub-system 16 displays the sighting presented in FIG. 8A on Graphical User Interface 30. The sighting results plotted as Lines of Positions presented in FIG. 8B and Running Fix presented in FIG. 8C are also displayed on the Graphical User Interface 30 for a user to see and respond by specific actions.

Figure 1A:
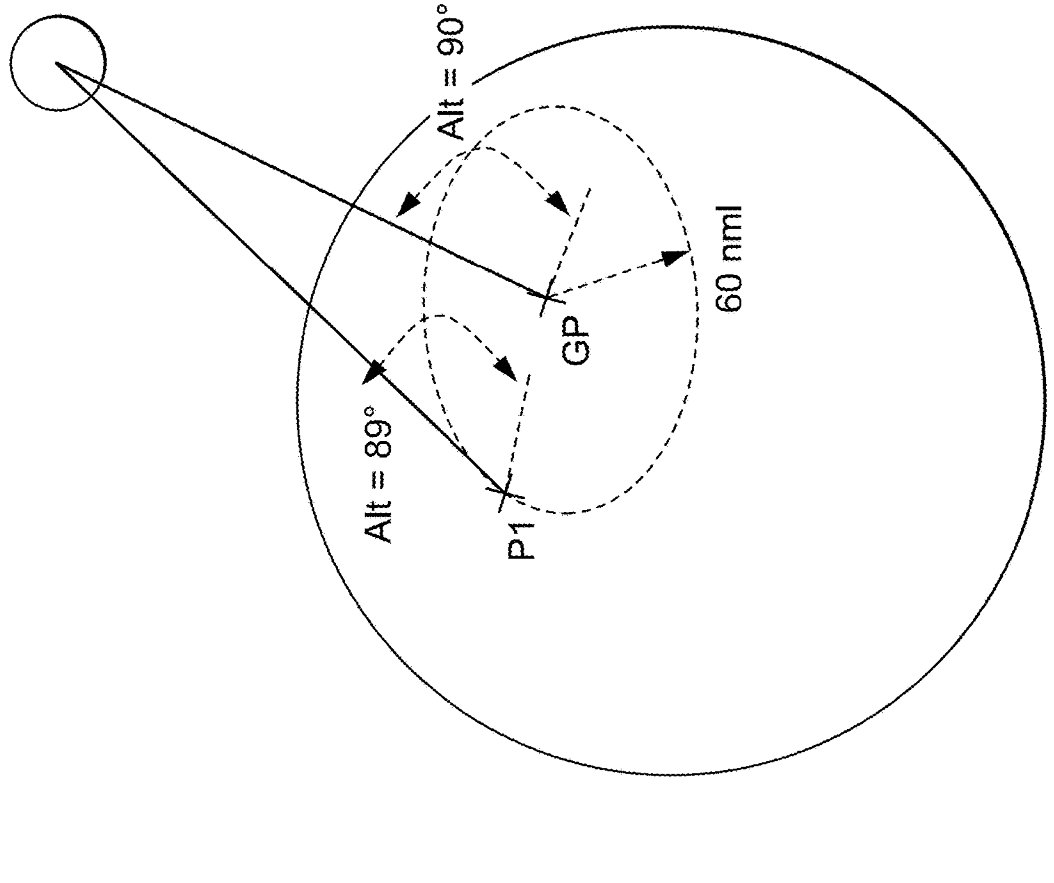
FIG. 1A Prior Art
FIG. 1A depicts the typical principles of the Global Positioning (GP)
Figure 1B:
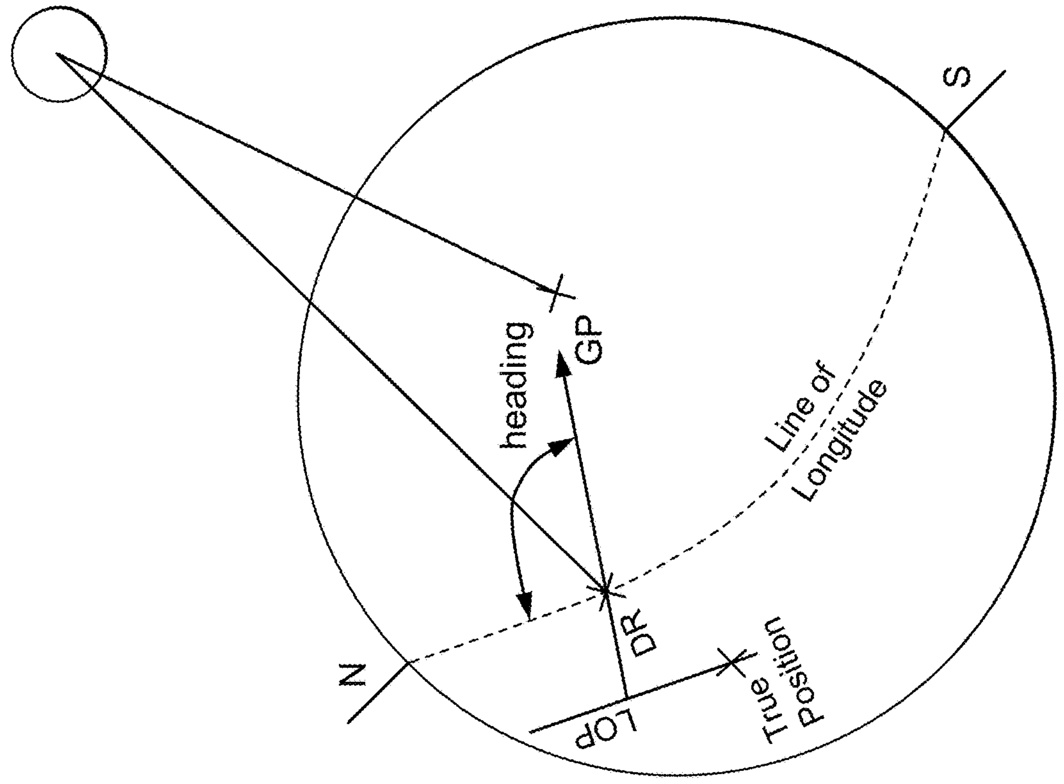
FIG. 1B Prior Art
FIG. 1B is representative of the typical principles of presenting the Line of Position (LP)
Figure 2:
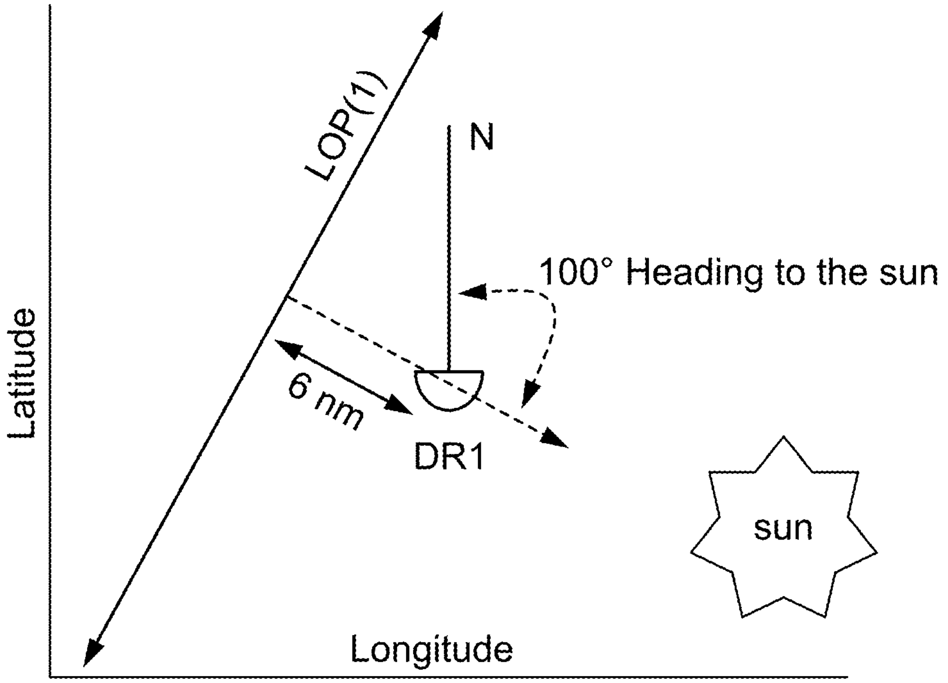
FIG. 2 Prior Art
FIG. 2 depicts an example of plotting a Line of Position as typical in the art.
Figure 3:
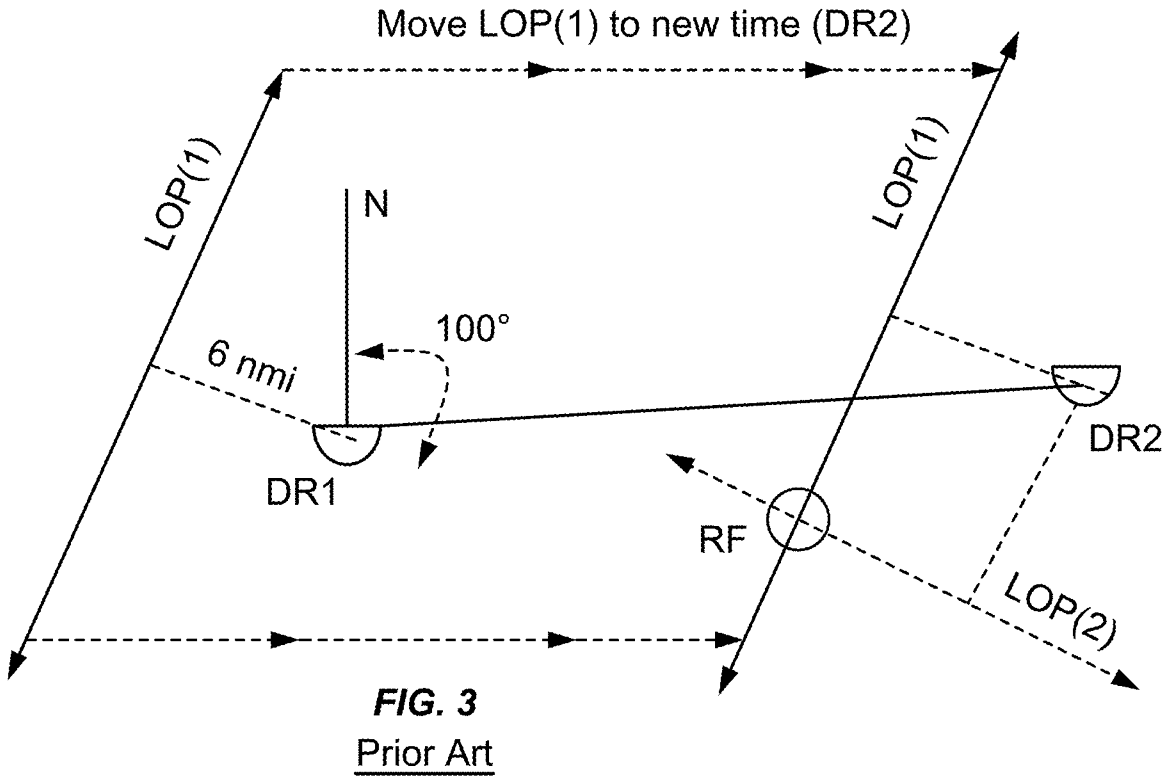
FIG. 3 Prior Art
FIG. 3 depicts an approach for generating a Running Fix (RF) from two sightings as typical in the art.
Figure 4B:
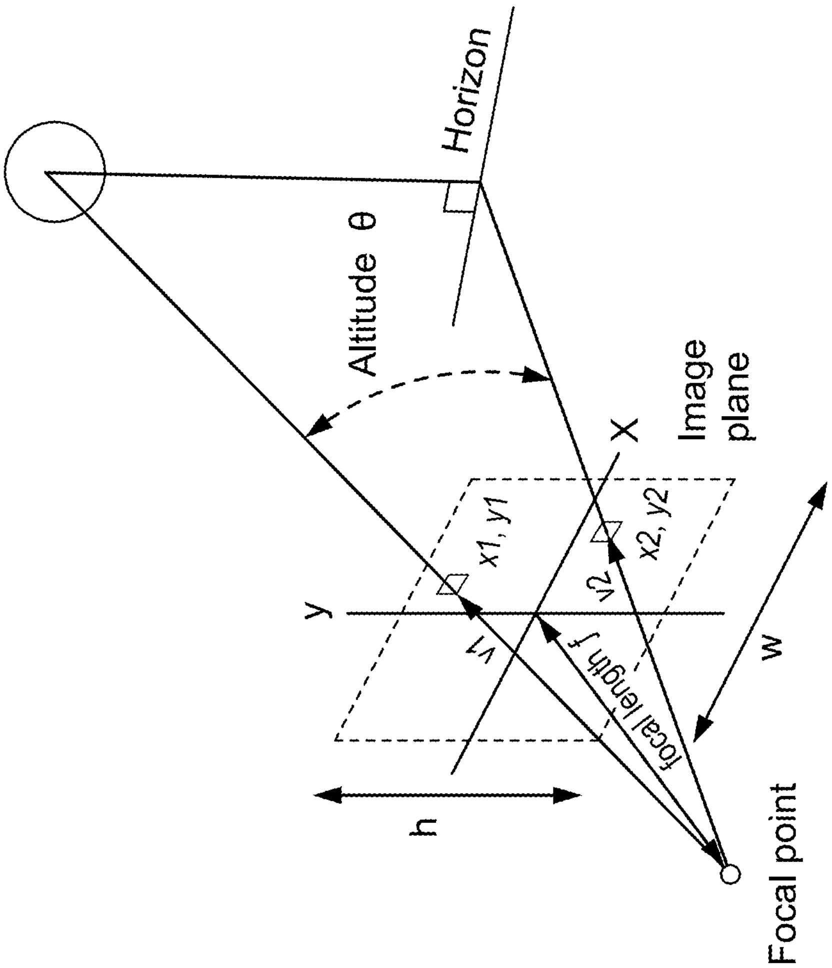
FIG. 4B Prior Art
FIG. 4B is a typical schematic representation of the pinhole camera model presenting a three-dimensional angle between objects.
Figure 4A:
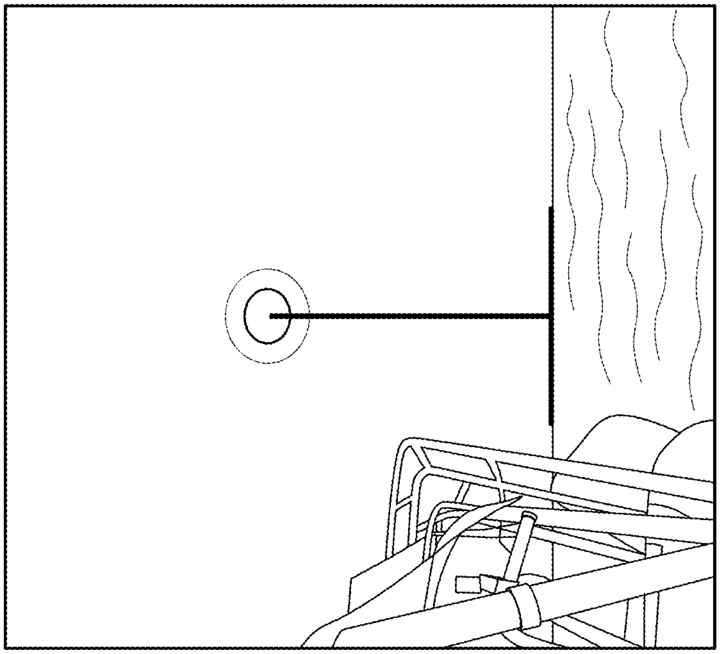
FIG. 4A Prior Art
FIG. 4A is a typical image taken at the sea.

As shown in FIG. 8C, an image 42 is provided with the sun and horizon line designated by the operator/program. From image 42, the x and y pixel values 52 for the Sun and horizon are found. A good starting point for calculating the 3D altitude is shown in FIG. 4B, namely, the pinhole camera model. If one knows the focal length of pixels (f), the altitude angle can be found using the dot product formula of the two vectors, v1 and v2, highlighted in Equation 1.

$$v1 = [x1, y1, -f]^T \quad \text{Equation 1}$$

$$v2 = [x2, y2, -f]^T$$

$$\theta = a\cos\left(v1^T v2 / (|v1||v2|)\right)$$

The size (widths and height) of the image plane and focal length of the camera (in meters) is found by querying the camera's Application Programming Interface (API). Using the display's image height and width in pixels, the focal lengths can be converted from meters to pixels.

Figure 10A:
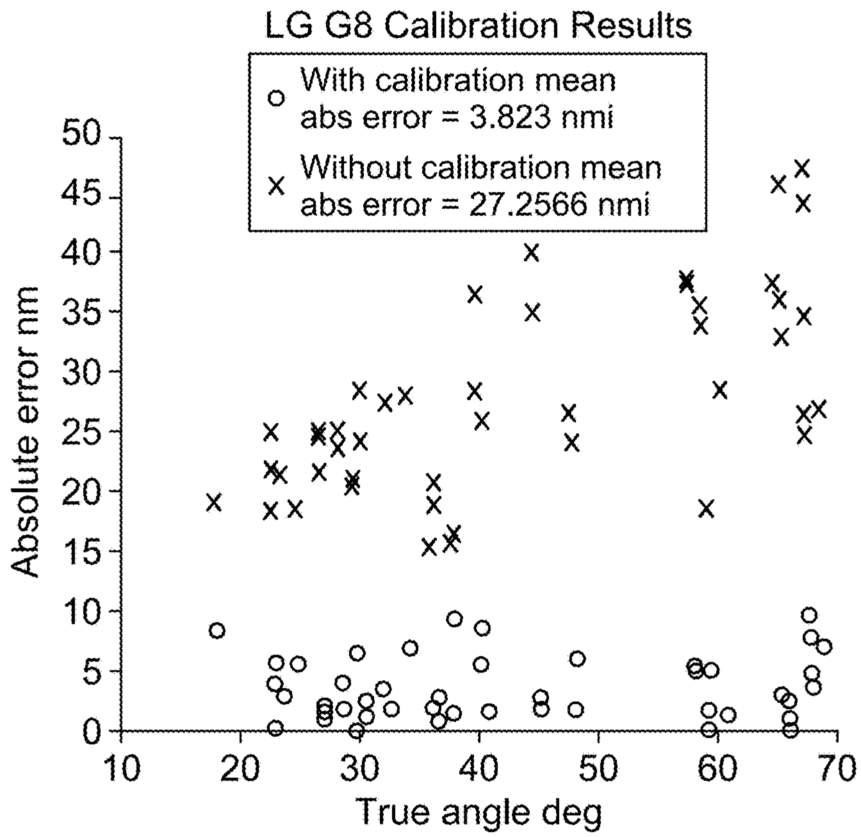
FIG. 10A is a plot of the absolute error (in nautical miles) vs. true altitude (with and without camera calibration) for LG G8 smartphone.
Figure 10B:
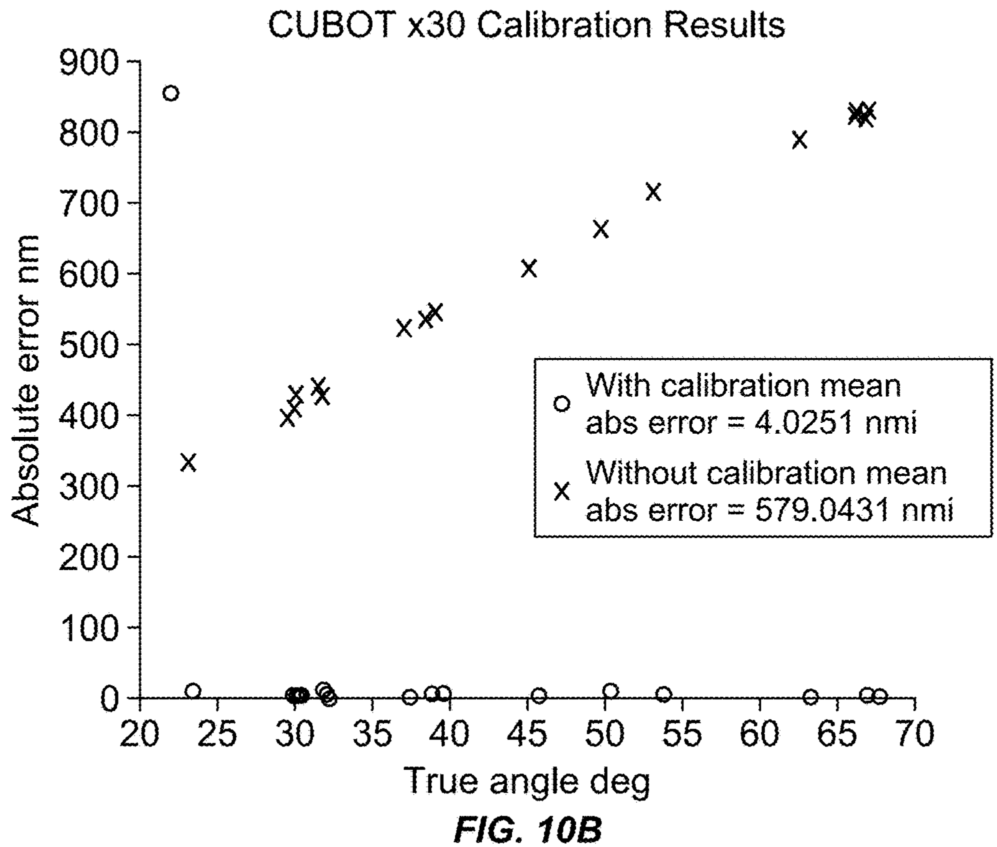
FIG. 10B is a plot of absolute error (with and without camera calibration) for CUBOT x30 smartphone.
Figure 10C:
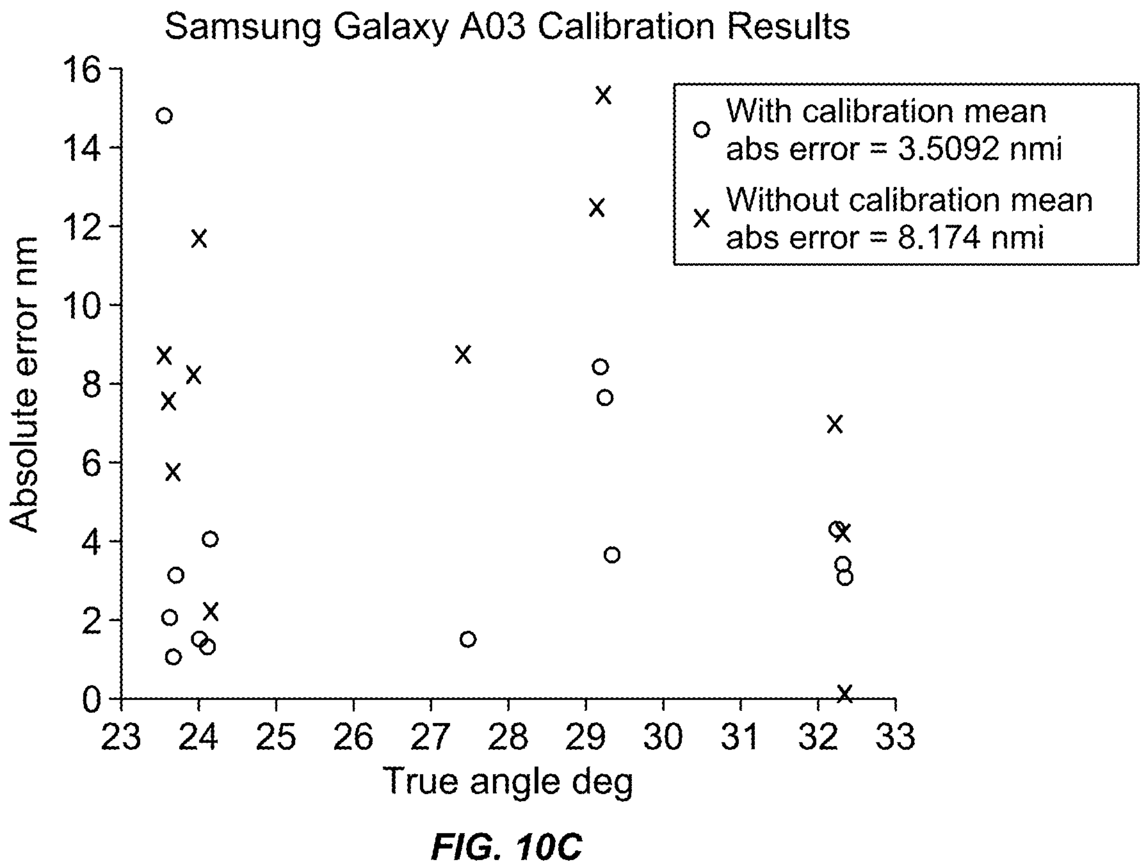
FIG. 10C is a plot of the absolute error (with and without camera calibration) for the Samsung Galaxy smartphone.

Unfortunately, using Equation 1 results in excessive errors indicated by crosses in FIGS. 10A-10C, which show the absolute error, i.e., the absolute difference between the measured angles (converted to nm) and the true angle. This data was collected during the sea trial where each image was timestamped along with an accurate latitude and longitude position. With this information, the true altitude can be calculated.

Errors as high as 40 nm for the LG phone and 650 nm for the CUBOT phone can be seen in FIGS. 10A-10C. Clearly, the simple camera model does not provide enough accuracy for marine navigation. However, the calibrated results indicated by circles in FIGS. 10A-10C highlight the substantial improvement in accuracy of the celestial navigation.

Referring to FIGS. 5, 6 and 7, the subject operation process of the smartphone 10 begins with the sextant sub-system 16 prompting a user to select the camera 12. Since most smartphones contain multiple cameras, the sextant sub-system 16 requests the user to select the camera 12 with a field of view (FOV) closest to 90°, i.e., the optimal FOV for the celestial navigation, As will be presented in the following paragraphs, only 5-10 images 42 each tagged with an accurate timestamp, latitude, and longitude, are required to calibrate the camera 12 using the subject calibration scheme. Once the camera 12 is calibrated, the 5-10 images need to be tagged only with time for the celestial navigation.

The operational principles of the subject system, as shown in FIG. 5, and further detailed in relation to FIGS. 6 and 7, are based on the following distinct steps:

In Step 1, a user uses camera 12 to take a picture that contains the Sun and horizon as presented in FIG. 8A. The picture which contains the Sun, and the horizon is entered through the User Interface 18 into the Camera Control Processor Unit 24.

In the following Step 2, the sextant sub-system 16, and specifically the Camera Control Processor Unit 24 embedded therein, transmits the control signal(s) 34 to the camera 12 for setting the camera's operational parameters to ensure that the image 42 is as accurate as possible. Namely, the control signal 34 carries coded requests to the camera 12 to (a) set the outer exposure to darken the image to prevent blooming of the Sun, (b) turn off the auto focus, (c) turn the camera stabilization to off to prevent any warping of pixel values, and (d) set the focus distance to infinity.

Responsive to setting up the camera's operational parameters, the CPU 36 of the camera 12 returns signals 38 corresponding to the focal length and image sensor sizes of the camera 12 to the Camera Control sub-system 24 for being used by the smartphone sextant sub-system 16 to calculate the value of the focal length in pixels 40, which is subsequently transmitted to the Navigation Calculations Processor Unit 50 and the Graphical User Interface Processor Unit 30, which are operatively coupled with each other for jointly process the data and generate navigation results, as will be detailed in the following paragraphs.

In the subsequent Step 3, the Sextant Processor Unit 16 acquires the image 42 from the camera 12 and processes the image 42 to ensure that the image 42 is not compressed to prevent loss of resolution of the image 42. The image 42 is stamped with the current time, latitude, and longitude data 44 by the internal GPS sub-system 14 of the smartphone 10.

The user may be prompted by the sextant sub-system 16 to update the phone's internal GPS data 44 with more accurate values. For example, the LG smartphone's GPS latitude and longitude values are not accurate enough. Therefore, an accurate external GPS may be used to correct the image, specifically the boat's Raymarine chart plotter's latitude and longitude values.

Upon completion of the operational Step 3, image 42 is displayed in Step 4 to the user through Graphical User Interface sub-system 30. Upon examining the image 42, the user designates the Sun and horizon at the display 31 of the Graphical User Interface sub-system 30, and the smartphone-based sextant sub-system 16 accurately finds the center pixel values 54 of the Sun and horizon using a centroid algorithm sub-system 52, which is operatively coupled to the Navigation Calculations Processor Unit 50 and the Graphical User Interface Processor Unit 30.

In the subsequent Step 5, if the user is satisfied with the quality of the image 42 and the accuracy of the latitude and longitude (with more accurate values 48 provided by the external GPS 46), the image (sighting) 42 can be used for the calibration operation, which may be initiated by the user pressing a Calibrate button 53 on the User Interface sub-system 18, which is provided and configured to enter the user's inputs. By pressing the Calibrate button 53, the user actuates the Calibration Processor Unit 32, which includes a Calibration Table 66, a Calibration File Processor Unit 72, and a Calibration Factor Calculation Processor Unit 70, to start the subject calibration process as will be detailed further herein.

In the following Step 6, the values 48 corresponding to the image's time and true position (latitude and longitude) provided by the external GPS 46 are sent from the Navigation Calculations Processor Unit 50 and/or the Graphical User Interface Processor Unit 30 to the Ephemeris/Almanac Processor Unit 22, which calculates the Sun's true altitude and heading 60 and transmits the values 60 to the Navigation Calculations Processor Unit 50 and/or the Graphical User Interface Processor Unit 30.

The pixel values 62 of the Sun (x1, y1) and the horizon (x2, y2), provided by the Navigation Calculations Processor Unit 50 and/or the Graphical User Interface Processor Unit 30, along with the Sun's true and measured altitude 64, provided by the Ephemeris/Almanach Processor unit 22, are saved in a file called the Calibration table 66. An example of the calibration table 66, as shown in FIG. 12, is generated from 5 sightings (images). It is to be understood that the number of images used for the camera calibration may differ form 5, and up to 10 sightings may be used in the subject calibration process.

Once the Calibration Table 66 has been generated, the calibration data 67 are transmitted in Step 7 to the Calibration file 72 and are used for further calibration routines as detailed in subsequent paragraphs.

Figure 11:
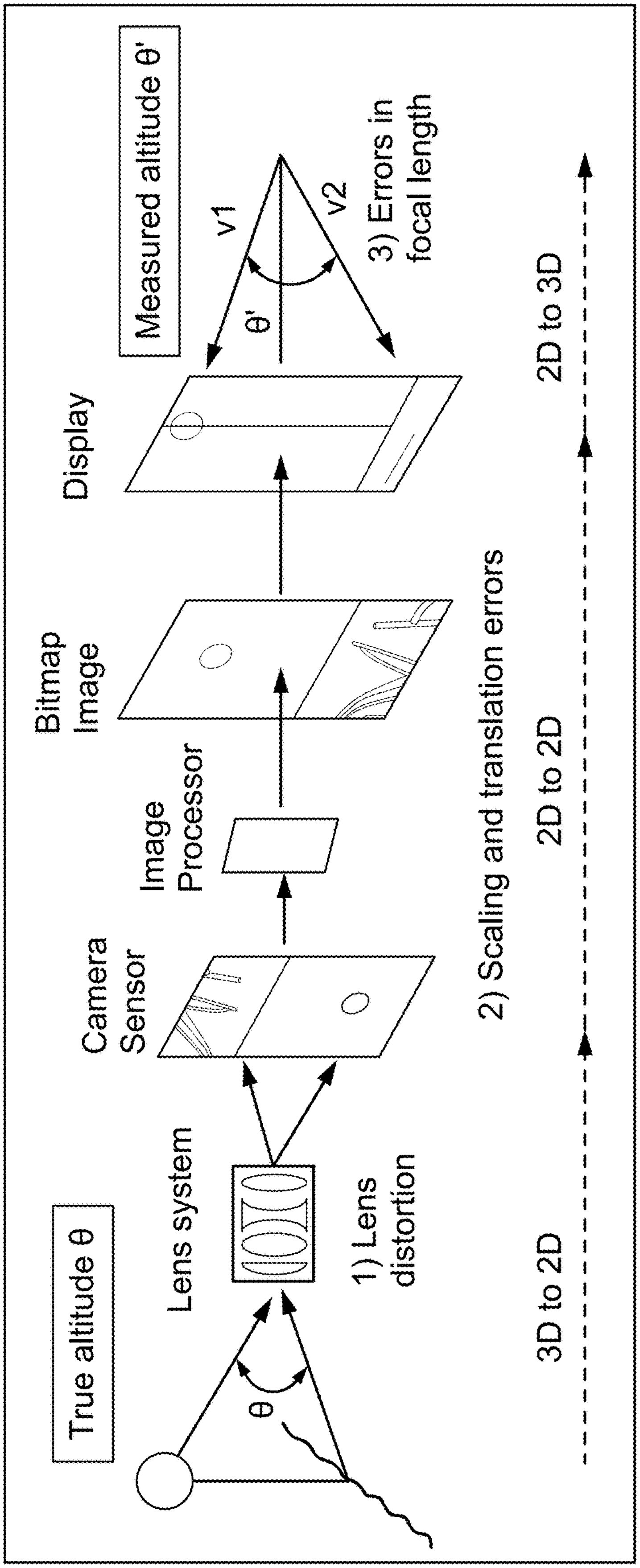
FIG. 11 is a block diagram of a real smartphone camera highlighting three sources of error.

The subsequent Step 8 is performed where a unique calibration calculation is performed to mitigate the camera errors. FIG. 11 depicts the true altitude and the measured altitude in association with a realistic smartphone camera. Sources of the camera's errors include (a) lens radial distortion caused by the far-from-ideal lens system, (b) unknown scaling and translation errors from the sensor to the final display (2D-to-3D), and (c) an inaccurate focal length. Therefore, camera's calibration is a necessary step in order to calculate the 3D matrix from an image taken by the camera.

Most camera calibration methods require a checkerboard type pattern to estimate the intrinsic parameters and lens distortion characteristics. However, the subject smartphone-based sextant sub-system 16 achieves the accuracies shown in FIGS. 10A-10B by implementing the subject camera calibration method.

It has been found through exhaustive search that two camera parameters are needed to be calibration effectively, including (a) a parameter "s" that compensates for scaling, sensor size, and focal length errors, and (b) second parameter "r" which compensates for the lens radial distortion, specifically along the y direction. These two parameters, s and r, are shown in Equation 2

$$v1 = [x1, (y1 + r \times y1^2), -f \times s]^T$$
$$v2 = [x2, (y1 + r \times y2^2), -f \times s]^T$$
$$\theta(s, r) = a\cos(v1^T v2 / (|v1||v2|))$$
Equation 2

Compensating for the scaling errors is achieved by multiplying the focal length by s, while the radial distortion is compensated for by multiplying $y^2$ by r. It was found empirically that compensating for radial distortion in this manner provides better results than the typical Brown-Conrady model presented in Z. Zhang, "A Flexible New Technique for Camera Calibration" published in IEEE, Transactions on Pattern Analysis and Machine Intelligence, Vol. 22, No. 11, pp. 1330-1334, November 2000.

The subject calibration scheme includes the routine of estimating the parameters r and s using the Calibration Table data presented in FIG. 12. The routine of estimating the parameters r and s is performed by the Calibration Processor unit 32, and particularly, the Calibration File 72 and Calibration Factor Calculation Processor Unit 70, presented in FIG. 5, which is composed of the Calibration Table 66, Calibration File 72, and Calibration Factor Calculation Processor Unit 70, and will be further presented in conjunction with FIGS. 6 and 7.

Specifically, the calibration factor K is computed and provided to the Navigation Calculations Processor Unit 50 to calibrate/compensate for errors the camera 12. The computation of the calibration factor K is performed by the Calibration Factor Calculation Processor Unit 70, presented in FIG. 5, and includes the routine of estimating the parameters r and s using the Calibration Table data 67. Since each of the 5-10 sightings used for calibration is tagged with the accurate latitude and longitude value 48, the true altitude angle $\theta_i$ is known for each sighting i, i.e., i=1, . . . , N, where N ranges from 5 to 10.

A cost function C (s, r) is computed based on the absolute error as shown in Equation 3 with C=0.001.

$$C(s, r) = \sum_{i=1}^{N} \sqrt{(\theta_i - \theta_i(s, r))^2 + c} \approx |\theta_i - \theta_i(s, r)| \quad \text{Equation 3}$$

It was found empirically that a cost function based on the absolute error outperformed a cost based on the square error. This is because the absolute error function is more robust against the outliers. Finding the values of parameters r and s that minimize Equation 3 is accomplished using the Newton-Raphson Non-Linear Optimization. The calculation of the calibration factors K for the parameters r and s is performed in the Calibration Factor Calculation sub-system 70.

Referring to FIG. 6, which details the flowchart of the subject process 600 running on the smartphone system 10 depicted in FIG. 5, the subject smartphone-based sextant sub-system (also referred to herein as an EZ smartphone sextant App, or a sextant sub-system, or a Sextant Processor Unit) 16 is embedded in the smartphone 10 and is configured for using a smartphone's camera 12 to take accurate sightings used for marine navigation. The subject process 600 is supported by software functional blocks executed by the smartphone system 10.

Process 600 is initiated with the logic block 601, which is supported by the User Interface sub-system 18 depicted in FIG. 5. The logic block 601 is configured to provide the user interface for entering a starting location and dead reckonings. In logic block 602, the system prompts the user to enter the starting location. Upon the starting location is entered, the logic advances to the logic block 604 to plot the starting location (for example, as depicted in FIG. 8B) on the Display 31 in the Graphical User Interface sub-system 30 of FIG. 5.

The procedure subsequently passes to decision block 606, where the user is prompted to enter the Dead Reconning (DR). If the DR is entered and the decision block 606 confirms the DR entering, the procedure flows to the logic block 608 to Enter Dead Reckoning, and subsequently advances to the logic block 610 to plot the entered Dead Reckoning (for example, as depicted on FIG. 8C) on the Display 31 in the Graphical User Interface sub-system 30 of FIG. 5. If, however, the decision block 606 does not confirm the entering of the DR, the logic flows to another decision block 612 "Sighting" to request the DR. If no DR is available, the logic loops to the logic block 606.

After the DR and the starting location are entered, the user has the option to make celestial sightings. To make a celestial sighting, the logic advances to the logic block 614 to estimate the intrinsic parameters of the smartphone camera 12 The intrinsic parameters of the smartphone camera are estimated with inputs 616 stored in the Calibration T 66 shown in FIG. 5. The details of calibration have been presented in previous paragraphs and will be further detailed in following paragraphs in association with FIG. 7.

From logic block 614, the logic flows to the logic block 618, where the system prompts the user to choose the camera 12 with a field of view (FOV) closest to 90° to provide the optimal FOV for sightings. In the logic block 618, the logic also prompts to turn OFF the auto focus (AF), auto exposure (AE) and auto stabilization of the smartphone camera and to set the focus length to infinity. These actions are needed to ensure that the focal length remains static when using the Sextant App to take a picture, as changes to the focal length will result in erroneous altitude angles computations.

Subsequently, the procedure flows to the logic block 620 to prompt the user to take a picture. After taking the picture, the user is instructed by the logic block 622 to tap on the Sun and horizon. This provides the Sextant App with a starting location for finding the center of the Sun and horizon.

From logic block 622, the process advances to the logic block 624, where the centroid algorithm 52 (also shown in FIG. 5) estimates the center of the Sun and the horizon line as depicted in FIG. 8A.

After the centroiding routine is performed in the logic block 624, the user may fine tune the position of the Sun and horizon by using arrow keys seen at the bottom of FIG. 8A. At the logic block 624, the final pixel values for the center of the Sun (x1, y1), and the horizon (x2, y2) are calculated. Note that the horizon position (x2, y2) is at the intersection of a line parallel to the horizon and a line from the Sun center orthogonal to the horizon.

Upon executing the routine in logic block 624, the procedure advances to the logic block 626, so that the user can verify that the date and time are correct and enters the height above the water. If a satisfactory sighting is made in the decision block 628, the App 16 flows to the logic block 630 (supported by the functionality of the Navigation Calculations Processor Unit 50 shown in FIG. 5), which calculates and plots the LOP and RF on the display 31 of the Graphical User interface 30 (shown in FIG. 5) using the Sun and horizon pixel values and the camera parameters estimated at by the logic block 614.

The accuracy of the LOPs and RFs are contingent on accurately measuring the altitude of the Sun. As seen in FIGS. 10A-10C, without calibration, merely by using the dot product to measure the angle (Equation 1), the measurement errors are highly inaccurate.

The process 600 further advances to the logic block 632 to execute the subject calibration process. For example, after collecting approximately one hundred time and position stamped images at sea, a detailed analysis shows that two camera parameters are sufficient to model the errors in the camera system. One parameter (s) compensates for scaling, sensor size, and focal length errors, and another parameter (r) compensates for lens radial distortion, specifically along the y direction. These two parameters, r and s, are presented in Equation 2, where the altitude angle θ is now parameterized by r and s. Compensating for scaling errors is achieved by multiplying the focal length by s, and the radial distortion is compensated for by multiplying $y^2$ by r. It was found empirically that compensating for lens distortion in this way performed better than the typical Brown-Conrady model.

To estimate the two calibration parameters, r and s, requires knowing the true angle to the horizon when the picture was taken. This can be done if the exact position is known when the picture was taken. If an image is to be used for calibration, an accurate latitude and longitude is entered in the logic block 634 from the logic block 638 which uses the accurate sources of position, such as the chart plotter or the VHF radio since these devices have high-quality GPS receivers.

It was found that some Android smartphones' GPS receivers did not provide sufficient accuracy for the camera calibration. At logic block 636, the image is stamped with the previously entered time and location. Subsequent to the logic block 636, the true angle for the celestial object is calculated in the logic block 640 by the Ephemeris 22 (also shown in FIG. 5) and added to the Calibration Table 66 which is subsequently stored. The Calibration Table 66 contains, for each sighting, the celestial object's pixel values (x1, y1), the horizon pixel values (x2, y2) and the true altitude. Table 2 shown in FIG. 12 depicts an example calibration table with five sightings.

In the logic block 614, the calibration routine estimates the parameters r and s by using the data in the calibration table 66 when making a sighting. The parameters r and s are also estimated in the logic block 642, when a new row is added in the calibration table 66. Since the five to ten sightings used for calibration are tagged with accurate latitude and longitudes, the true altitude angle $\theta_i$, derived from the Ephemeris, is known for each sighting i 1, . . . , N.

A cost function C(s, r) based on the absolute error is a function based on the absolute error outperformed a cost based on the squared error. This is because the absolute error function is more robust against outliers. Finding the values r and s that minimize Equation 3 is accomplished using Newton-Raphson non-linear optimization. Note that Equation 3 approximates the sum of the absolute error.

The Newton-Raphson update equation is $$\begin{bmatrix} r_n \\ s_s \end{bmatrix} = \begin{bmatrix} r_{n-1} \\ s_{s-1} \end{bmatrix} - H^{-1}\nabla \qquad \text{Equation 4}$$

where $$\nabla = \begin{bmatrix} \frac{dC}{dr} \\ \frac{dC}{ds} \end{bmatrix}\Bigg\|_{[r_{n-1}, s_{n-1}]} \qquad \text{Equation 5}$$

and $$H = \begin{bmatrix} \frac{d^2C}{dr^2} & \frac{d^2C}{drds} \\ \frac{d^2C}{drds} & \frac{d^2C}{ds^2} \end{bmatrix}\Bigg\|_{[r_{n-1}, s_{n-1}]} \qquad \text{Equation 6}$$

In Equations 4-6, the gradient vector ∇ contains the first derivatives of the cost function, and H is the Hessian matrix containing the second derivatives both evaluated at the current estimate $r_n$ and $s_n$. The closed-form solution to the derivatives can be found using the chain rule.

FIG. 7 is a flowchart diagram illustrating a process 700 designed to estimate the camera parameters r and s which is executed by the Calibration Factor Calculation Processor Unit 70 of FIG. 5, namely implementing Equation 4. Process 700 is supported by the Calibration Processor Unit 32 of FIG. 5 and contains two loops, (i) the outer loop which runs until the convergence, or the maximum value are attained, and (ii) the inner loop which iterates through the calibration table rows.

Process 700 is initiated at the logic block 701, where the current calibration table 66 is loaded from a non-volatile storage. At the subsequent logic block 702, the camera parameters are initialized to default values, i.e., the scaling s=1 and the lens distortion parameter r=0.

At the following logic block 703, the outer loop begins, and the five first and second derivative values contained in ∇ and H are set to zero.

The inner loop starts at the logic block 704 by reading the $i^{th}$ row from the calibration table 66.

At the subsequent logic block 705, the five first and second derivatives are calculated at the current values of r and s and accumulated over the inner loop.

The logic further advances to the logic block 706, where the derivative values are divided by N, i.e., the number of rows in the calibration table 66, to form an average.

At the following logic block 707, Equation 4 is evaluated, and the current estimate of r and s is updated. The change in r and s during this iteration is calculated in Err=norm ($[r_n, s_n]-[r_{n-1}, s_{n-1}]$). If Err is less than 1e-7, then the outer loop ends since this indicates convergence. The final values of r and s are returned and used in Equation 2 to calculate the calibrated altitude angle θ(r, s) for use in sightings.

Because the utility of the sextant smartphone App 16 relies heavily on camera accuracy, a number of cameras have been tested and used to collect data associated with their performance, as shown in the Table 1 in FIG. 9. For example, 50 images were collected at sea and accurately stamped with the time, latitude and longitude for the LG-G8 phone and CUBOTx30 phone. A Monte Carlo simulation was performed to measure the accuracy of the system. Specifically, for the testing, 10,000 testing runs have been performed with each run including: (a) selecting 10 images at random and estimating the calibration factors r and s, (b) subsequently, choosing an image at random from the remaining 40 images and testing the chosen image, i.e., using the values of r and s to calculate the angle θ(s, r) using Equation 2. Since the true angle $\theta_i$ for the image is known, an absolute error $|\theta_i-\theta_{(s,r)}|$ can be calculated. The accuracy value is then the mean of the absolute errors from the 10,000 runs. The mean error, also shown in FIG. 9, is the mean value of the error=$\theta_i-\theta_{(s,r)}$.

As presented in Table 1 shown in FIG. 9, which outlines the cameras that have been tested along with their parameters and accuracy results, the accuracies (mean absolute error) of less than 4 nm were achieved using 10 images to calibrate each camera. Also of importance is that the mean error of approximately 0 nm has been achieved, meaning there are no biases in the sightings. This result ensures that the subject smartphone-based sextant sub-system 16 is a powerful tool for the real-world celestial navigation.

Described here is an approach to transforming a smartphone camera into an accurate sextant for use in celestial navigation. To realize accuracies commensurate with marine navigation, a unique camera calibration scheme is implemented. The subject smartphone sextant was programmed on a higher-priced LG phone model LM-G820UM and a lower-priced CUBOT X30, both using Android version 12. The Sextant App was real-world tested during sea trials on a 38-foot Island Packet sailboat 3 to 30 nautical miles (nm) off the East Coast of the United States over a two year period in various sea-state conditions.

Figure 13:
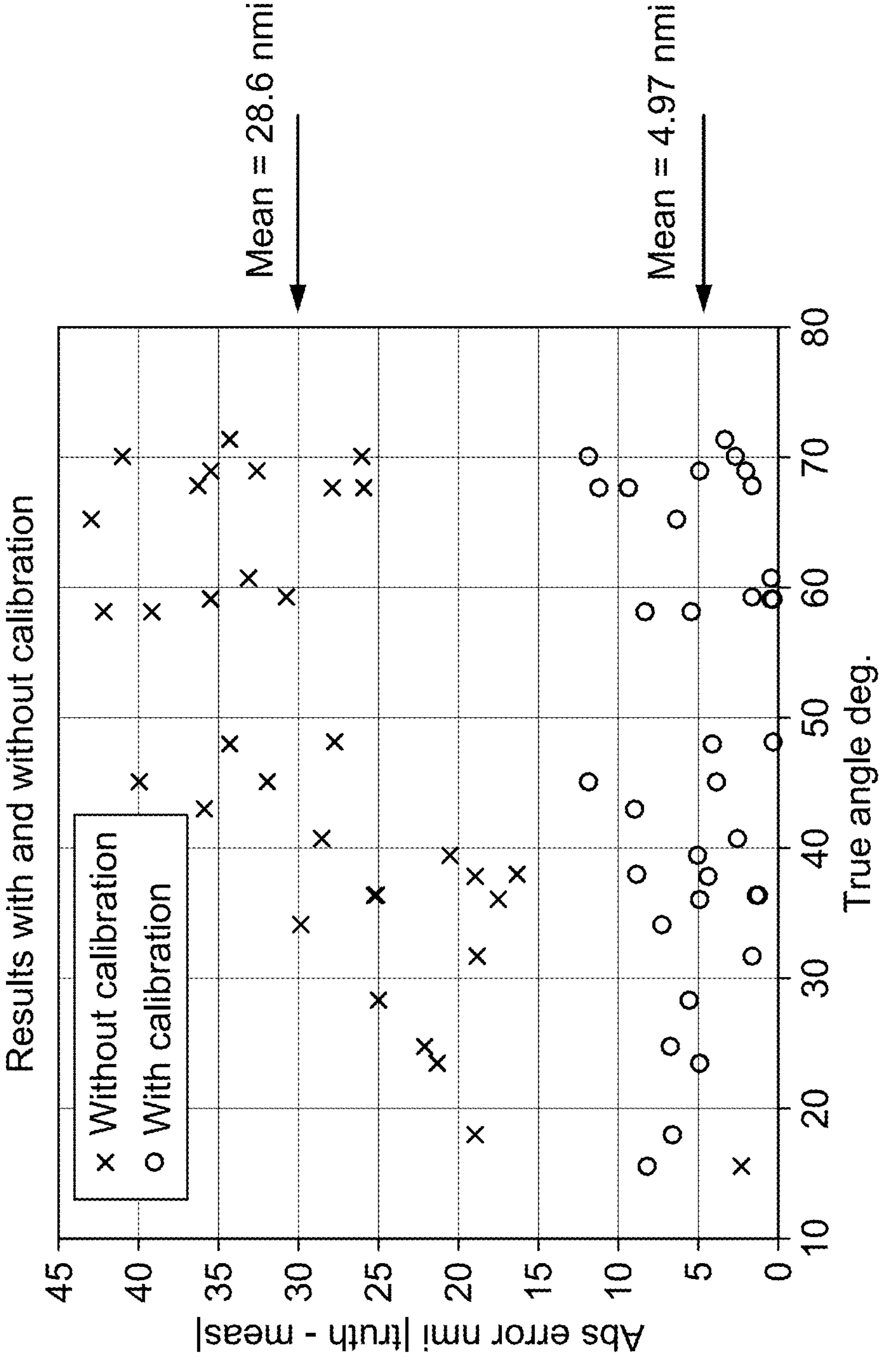
FIG. 13 is a diagram representative of the absolute error (in nm) for the tested LG sextant with the calibration and without calibration.
Figure 14A:
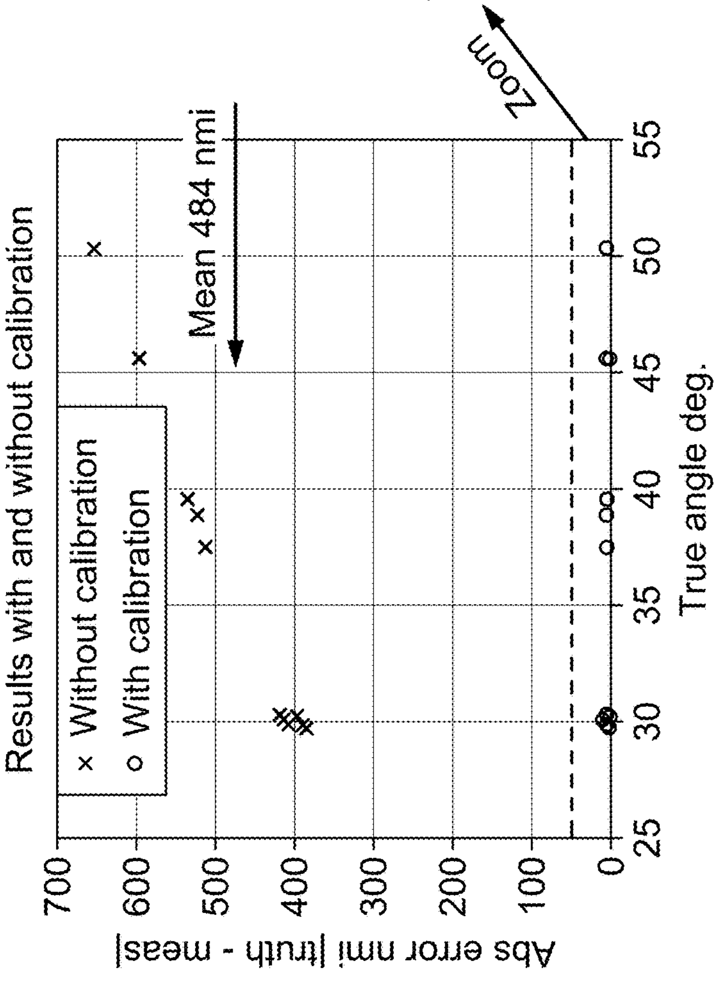
FIGS. 14A-14B are diagrams representative of the absolute error (in nm) with calibration (FIG. 14A) and without calibration (FIG. 14B)
Figure 14B:
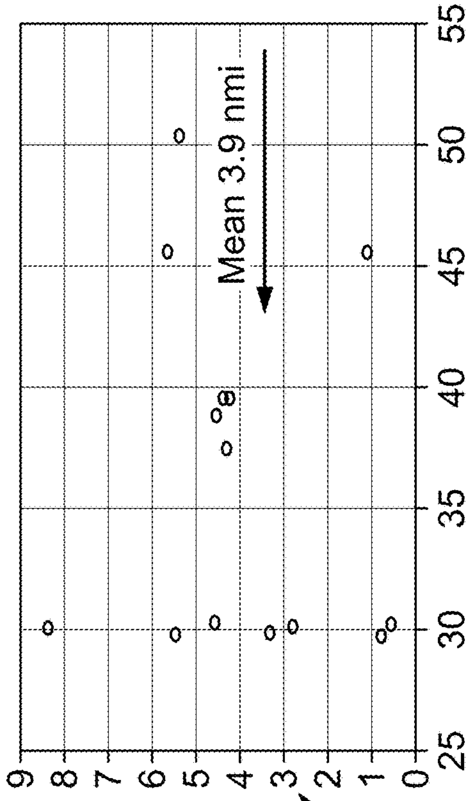

The results of the calibration described in the previous paragraphs are shown in FIG. 13 for the LG and FIG. 14 for the CUBOT. With calibration, the mean error decreases from 28.6 nm to 4.97 nm for the LG and 484 nm to 3.9 nm for the CUBOT. Using the model described by Equation 2 results in very accurate measurements once the value for the calibration factor K is estimated.

The optimal number of images used in calibrating the smartphone camera seems to be from 5 to 10, but satisfactory results are attained with as low as three images. The calibrating simply entails making sure the image is tagged with an accurate time, latitude, and longitude. The images used in the sea trials were time stamped with the phone's internal GPS clock, but the latitude and longitude came from the vhf radio's GPS. The smartphone's GPS did not provide accurate latitude and longitude when out at sea.

Figure 15A:
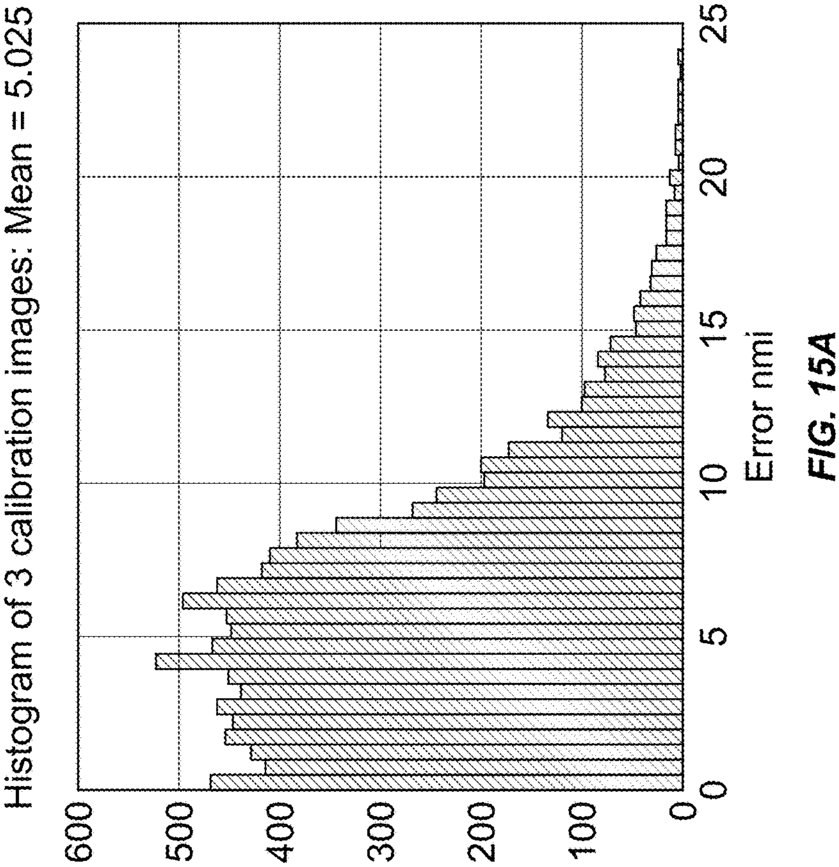
FIGS. 15A-15C are histogram diagrams representative of Monte-Carlo results based on 3 images (FIG. 15A), 5 images (FIG. 15B), and 10 images (FIG. 15C).
Figure 15B:
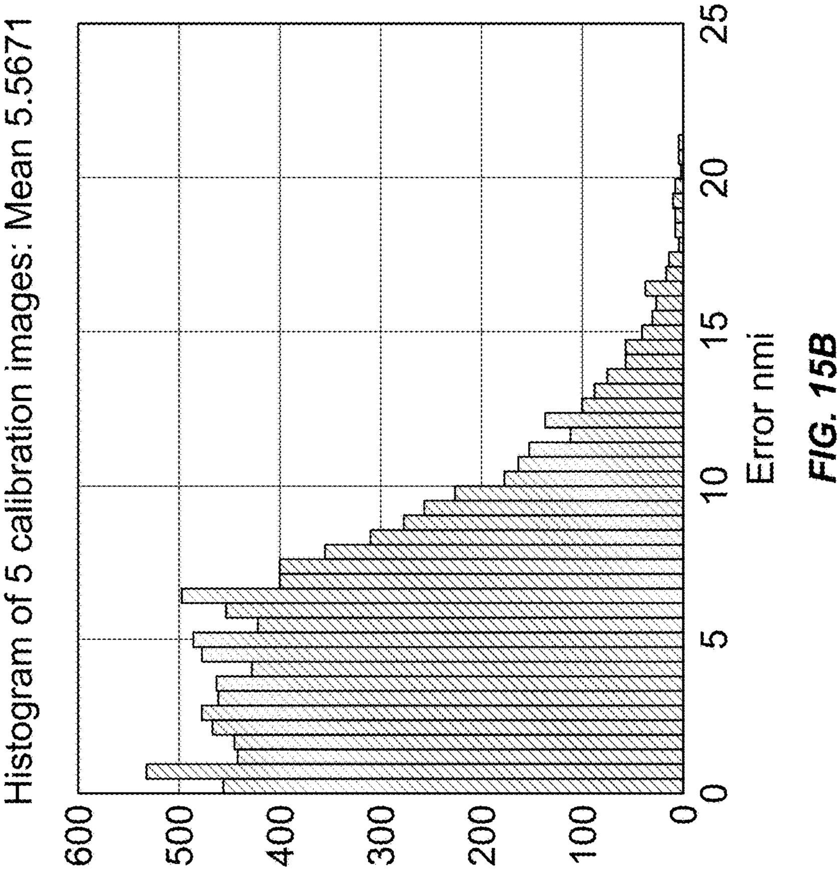
Figure 15C:
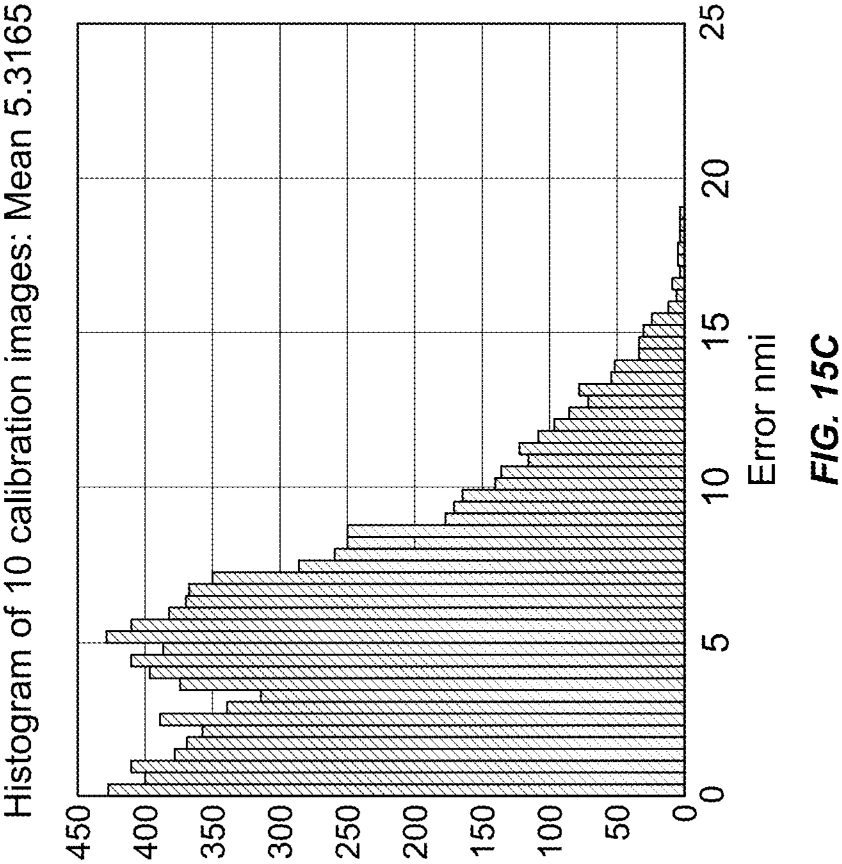

To determine the number of images needed to calibrate the camera, 10,000 Monte Carlo simulations were run on a total of 35 images collected during the sea trial for the LG phone. The simulation randomly picked three, five, or 10 images to use for calibration, estimate the calibration factor K, then randomly pick an image not used in calibration to test. This simulation provides results that would be seen in a real-world navigation scenario. As shown in the FIGS. 15A, 15B and 15C, the mean error is 5.9 nm, 5.56 nm, and 5.34 nm, for three, five, or 10 images respectively, used in calibration. This result clearly shows that 5 to 10 images are more than sufficient to use for calibration.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of elements, steps, or processes may be reversed or interposed, all without departing from the spirit or scope of the invention as defined in the appended claims.

What is claimed is:

1. A smartphone-based sextant for celestial navigation, comprising:

a camera installed in a smartphone and adapted for taking a predetermined number of images having a celestial object and a horizon line, each image of said predetermined number of images being tagged with a timestamp, a latitude, and longitude;

a GPS sub-system providing said timestamp, latitude and longitude for tagging said each image, and a Calibration Processor Unit for an automated calibration of said camera, said Calibration Processor Unit being embedded in the smartphone in operative coupling to said camera and said GPS sub-system, said Calibration Processor Unit being configured with:

a Camera Control Processor Unit operatively coupled to said camera to ensure an accuracy of said each image, a Graphical User Interface Processor Unit operatively coupled to said camera and Camera Control Processor Unit, said Graphical User interface Processor Unit being configured for receiving from said camera and displaying thereon said each image tagged with said timestamp, latitude and longitude, a Navigation Calculations Processor Unit operatively coupled to said camera, Camera Control Processor Unit, and said Graphical User Interface Processor Unit, said Navigation Calculations Processor Unit being configured to process a celestial object and horizon designated through said Graphical Unit Interface processor unit and to calculate center pixel values (x1, y1) and (x2,y2) of positions of the celestial object and horizon, respectively, a User Interface sub-system operatively coupled to said Navigation Calculations Processor Unit and Graphical User Interface Processor Unit and actuatable once said each image is chosen to be used as a calibration image for calibration processing, an Ephemeris/Almanac Processor Unit operatively coupled to said Navigation Calculations Processor Unit and Graphical User Interface Processor Unit and configured to compute a true altitude control heading of said celestial object based on said timestamp, latitude and longitude of said calibration image received from said Navigation Calculations Processor Unit and Graphical User Interface Processor Unit, a Calibration Table Processor Unit operatively coupled to said Ephemeris/Almanac Processor Unit, Navigation Calculations Processor Unit, and Graphical User Interface Processor Unit and configured to store said center pixel values (x1, y1) of the celestial object and pixel values (x2, $y_2$) of the horizon along with the true altitude and the measured altitude of the celestial object on said each image for said predetermined number of images, a Calibration Factor Calculation Processor Unit operatively coupled to said Calibration Table Processor Unit, Navigation Calculations Processor Unit, and Graphical User Interface Processor Unit, and configured to compute a calibration factor K(s, r) to be transmitted to said Navigation Calculations Processor Unit to mitigate errors associated with parameters s and r of said camera, by compensating said errors associated with said parameter s for scaling, image sensor size, and focal length, and by compensating said errors associated with said parameter r for lens radial distortion.

2. The smartphone-based sextant for celestial navigation of claim 1, wherein said camera has a field-of-view (FOV) of approximately 90°.

3. The smartphone-based sextant for celestial navigation of claim 1, wherein said Camera Control Processor Unit is configured to receive said each image, processing said each image, a generate a camera control signal to said camera, said camera control signal providing a coded request to set the auto exposure of the camera to darken said each image to prevent blooming of the celestial object, to turn off the auto focus regime of said camera, to set off a stabilization regime of said camera, and to set the focus distance of said camera to infinity.

4. The smartphone-based sextant for celestial navigation of claim 3, wherein said Calibration Calculations Processor Unit is further configured to compensate for the scaling errors by multiplying the focal length by said parameter s.

5. The smartphone-based sextant for celestial navigation of claim 4, wherein said Calibration Calculations Processor Unit is further configured to compensate the lens radial distortion by multiplying the pixel value y2 by said parameter r.

6. The smartphone-based sextant for celestial navigation of claim 5, wherein said Calibration Calculations Processor Unit is further configured to estimate said parameters r and s based on the values stored in said Calibration Table Processor Unit by applying Newton-Raphson non-linear optimization.

7. The smartphone-based sextant for celestial navigation of claim 6, wherein said Camera Control Processor Unit is further configured to compute a focal length of said camera in pixels based on a focal length and an image sensor size of said camera.

8. The smartphone-based sextant for celestial navigation of claim 1, wherein said center pixel values are calculated by said Navigation Calculations Processor Unit by applying a centroid algorithm to said celestial object and horizon found in said each image.

9. The smartphone-based sextant for celestial navigation of claim 8, wherein said Graphical User Interface Processor Unit is further configured to receive a signal indicative of a quality and a correctness of the latitude and longitude of said each image.

10. The smartphone-based sextant for celestial navigation of claim 1, wherein said predetermined number of images ranges from 5 to 10.

11. A method for calibrating a camera in a smartphone-based sextant for celestial navigation, comprising:

- adapting camera installed in a smartphone for taking a predetermined number of images having a celestial object and a horizon line,
- tagging each image of said predetermined number of images with a timestamp, a latitude, and longitude provided by a GPS sub-system,
- embedding a Calibration Processor Unit in the smartphone in operative coupling to said camera and said GPS sub-system,
- operatively coupling a Camera Control Processor Unit to said camera to ensure an accuracy of said each image,
- operatively coupling a Graphical User Interface Processor Unit to said camera and Camera Control Processor Unit, and configuring said Graphical User Interface Processor Unit for receiving from said camera and displaying thereon said each image tagged with said timestamp, latitude and longitude,
- operatively coupling a Navigation Calculations Processor Unit to said camera, Camera Control Processor Unit, and said Graphical User Interface Processor Unit, and configuring said Navigation Calculations Processor Unit to process a celestial object and horizon designated through said Graphical Unit Interface Processor Unit and to calculate center pixel values (x1, y1) and (x2, y2) of positions of the celestial object and horizon, respectively,
- operatively coupling a User Interface sub-system to said Navigation Calculations Processor Unit and Graphical User Interface Processor Unit, and actuating said User interface sub-system once said each image is chosen to be used as a calibration image for calibration processing,
- operatively coupling an Ephemeris/Almanac Processor Unit to said Navigation Calculations Processor Unit and Graphical User Interface Processor Unit, and configuring said Ephemeris/Almanac Processor Unit to compute a true altitude control heading of said celestial object based on said timestamp, latitude and longitude of said calibration image received from said Navigation Calculations Processor Unit and Graphical User Interface Processor Unit,
- operatively coupling a Calibration Table Processor Unit to said Ephemeris/Almanac Processor Unit, Navigation Calculations Processor Unit, and Graphical User Interface Processor Unit, and configuring said Calibration Table Processor Unit to store said center pixel values (x1, y1) of the celestial object and pixel values (x2, y2) of the horizon along with the true altitude and the measured altitude of the celestial object on said each image for said predetermined number of images,
- operatively coupling a Calibration Factor Calculation Processor Unit to said Calibration Table Processor Unit, Navigation Calculations Processor Unit, and Graphical User Interface Processor Unit, and configuring said Calibration Factor Calculation Processor Unit to compute a calibration factor K(s, r) for transmission to said Navigation Calculations Processor Unit to mitigate errors associated with parameters s and r of said camera, by compensating said errors associated with said parameter s for scaling, image sensor size, and focal length, and by compensating said errors associated with said parameter r for lens radial distortion.

12. The method for calibrating a camera in a smartphone-based sextant for celestial navigation of claim 11, wherein said camera has a field-of-view (FOV) of approximately 90°.

13. The method for calibrating a camera in a smartphone-based sextant for celestial navigation of claim 11, further comprising the steps of setting the auto exposure of the camera to darken said each image to prevent blooming of the celestial object, turning off the auto focus regime of said camera, setting off a stabilization regime of said camera, and setting the focus distance of said camera to infinity.

14. The method for calibrating a camera in a smartphone-based sextant for celestial navigation of claim 13, further comprising the step of compensating, by said Calibration Calculations Processor Unit, the scaling errors of said camera by multiplying the focal length by said parameter s.

15. The method for calibrating a camera in a smartphone-based sextant for celestial navigation of claim 14, further comprising the step of compensating, by said Calibration Calculations Processor Unit, the lens radial distortion by multiplying the pixel value y2 by said parameter r.

16. The method for calibrating a camera in a smartphone-based sextant for celestial navigation of claim 15, further comprising the step of estimating said parameters "r" and "s", by said Calibration Calculations Processor Unit, by processing the values stored in said Calibration Table Processor Unit by applying Newton-Raphson non-linear optimization.

17. The method for calibrating a camera in a smartphone-based sextant for celestial navigation of claim 16, further comprising the step of: computing, by said Camera Control Processor Unit, a focal length of said camera in pixels based on a focal length and an image sensor size of said camera.

18. The method for calibrating a camera in a smartphone-based sextant for celestial navigation of claim 11, further comprising calculating, by said Navigation Calculations Processor Unit, said center pixel values by applying a centroid algorithm to said celestial object and horizon found in said each image.

19. The method for calibrating a camera in a smartphone-based sextant for celestial navigation of claim 18, further comprising: receiving, at said Graphical User Interface Processor Unit, a signal indicative of a quality and a correctness of the latitude and longitude of said each image.

20. The method for calibrating a camera in a smartphone-based sextant for celestial navigation of claim 11, wherein said predetermined number of images ranges from 5 to 10.

* * * * *